United States Patent
Gulba

(10) Patent No.: US 11,678,659 B2
(45) Date of Patent: Jun. 20, 2023

(54) USE AS RODENTICIDES OF COMPOUNDS THAT INHIBIT BLOOD COAGULATION

(71) Applicant: Dietrich Gulba, Essen (DE)

(72) Inventor: Dietrich Gulba, Essen (DE)

(*) Notice: Subject to any disclaimer, the term of this patent is extended or adjusted under 35 U.S.C. 154(b) by 0 days.

(21) Appl. No.: 15/317,716

(22) PCT Filed: Jun. 11, 2015

(86) PCT No.: PCT/EP2015/063056
§ 371 (c)(1),
(2) Date: Dec. 9, 2016

(87) PCT Pub. No.: WO2015/189331
PCT Pub. Date: Dec. 17, 2015

(65) Prior Publication Data
US 2017/0127667 A1    May 11, 2017

(30) Foreign Application Priority Data
Jun. 11, 2014 (DE) ............ 10 2014 108 210.9

(51) Int. Cl.
| A01N 25/00 | (2006.01) |
| A01N 41/06 | (2006.01) |
| A01N 43/40 | (2006.01) |
| A01N 43/44 | (2006.01) |
| A01N 43/80 | (2006.01) |

(52) U.S. Cl.
CPC ........... *A01N 25/004* (2013.01); *A01N 41/06* (2013.01); *A01N 43/40* (2013.01); *A01N 43/44* (2013.01); *A01N 43/80* (2013.01)

(58) Field of Classification Search
CPC ...... A01N 25/004; A01N 43/80; A01N 43/44; A01N 43/40; A01N 41/06; A61K 31/397
See application file for complete search history.

(56) References Cited

U.S. PATENT DOCUMENTS

| 4,011,332 | A |   | 3/1977  | Schoetensack et al. |
| 4,051,141 | A |   | 9/1977  | Castaigne |
| 4,101,653 | A |   | 7/1978  | Okamoto et al. |
| 4,529,596 | A |   | 7/1985  | Aubert et al. |
| 4,591,592 | A |   | 5/1986  | Chowhan |
| 4,847,265 | A |   | 7/1989  | Badorc et al. |
| 5,288,726 | A | * | 2/1994  | Koike ............... C07D 495/04 514/301 |
| 5,679,690 | A |   | 10/1997 | Andre et al. |
| 5,721,366 | A |   | 2/1998  | Abood et al. |
| 6,693,115 | B2 |  | 2/2004  | Asai et al. |
| 2003/0191115 | A1 | | 10/2003 | Pinto et al. |
| 2003/0216437 | A1 | | 11/2003 | Chackalamannil et al. |
| 2003/0220317 | A1 | | 11/2003 | Andersson et al. |
| 2009/0221637 | A1 | | 9/2009  | Owoo |
| 2011/0268692 | A1 | | 11/2011 | Endepols |

FOREIGN PATENT DOCUMENTS

| AU | 508 245 B2      | 3/1980  |
| AU | 2015273561 B2   | 5/2018  |
| DE | 690 12 630 T2   | 3/1995  |
| EP | 0099802 A1      | 2/1984  |
| EP | 0608828 A1      | 8/1994  |
| EP | 0656348 A2      | 6/1995  |
| EP | 1298132 A1      | 4/2003  |
| EP | 1336605 A1      | 8/2003  |
| EP | 1813282 A1      | 8/2007  |
| EP | 1867331 A1      | 12/2007 |
| EP | 2343290 A1      | 7/2011  |
| EP | 2374456 A1      | 10/2011 |
| EP | 2607348 A2      | 6/2013  |
| GB | 1 350 900 A     | 4/1974  |
| GB | 2372986 A       | 9/2002  |
| JP | S50-117916 A    | 9/1975  |
| JP | S52-87233 A     | 7/1977  |
| JP | S5951277 A      | 3/1984  |
| JP | H09278604 A     | 10/1997 |
| JP | 2000504313 A    | 4/2000  |
| JP | 2003533522 A    | 11/2003 |
| JP | 2008534552 A    | 8/2008  |
| JP | 2010522169 A    | 7/2010  |
| JP | 2012-505259 A   | 3/2012  |
| KR | 20030001507 A   | 1/2003  |
| KR | 20110069168 A   | 6/2011  |
| NZ | 533342 A        | 11/2005 |
| WO | WO-90/15620 A1  | 12/1990 |
| WO | WO-93/19046 A1  | 9/1993  |
| WO | WO-1994/029336 A1 | 12/1994 |
| WO | WO-95/14683 A1  | 6/1995  |
| WO | WO-97/24118 A1  | 7/1997  |
| WO | WO-1997/23499 A1 | 7/1997  |
| WO | WO-199837075 A1 | 8/1998  |

(Continued)

OTHER PUBLICATIONS

Wong, P., Preclinical discovery of apixaban, a direct and orally bioavailable factor Xa inhibitor, 2011, Journal of Thrombosis and Thrombolysis, vol. 31, pp. 478-492 (Year: 2011).*
Serebruany, V.L., Gastrointestinal adverse events after dual antiplatelet therapy: clopidogrel is safer than ticagrelor, but prasugrel data are lacking or inconclusive, 2013, Cardiology, vol. 126, Issue 1, Abstract. (Year: 2013).*
Rosencher, N., "XimelagaLian, a new oral direct thrombin inhibitor, for the prevention of venous thromboembolic events in major elective orthopaedic surgery. Efficacy, safety and anaesthetic considerations." Anaesthesia, 2004, vol. 59, pp. 803-810, Blackwell Publishing Ltd.
Esekowitz, Michael D., et al., "The Evolving Field of Stroke Prevention in Patients With Atrial Fibrillation", Stroke, Journal of the American Heart Association, Oct. 2010;41:S17-S20, http://stroke.ahajournals.org/content/41/10_suppl_1/S17.
Shirasaki, Yasufumi, et al., "Comparison of the effect of edoxaban, a direct factor Xa inhibitor, with a direct thrombin nhibitor, melagatran, and heparin on intracerebral hemorrhage induced by collagenase in rats", Thrombosis Research 133, 2014, pp. 622-628, journal homepage: www.elsevier.com/locate/thromres.

(Continued)

*Primary Examiner* — Monica A Shin

(57) ABSTRACT

The invention relates to a use, a method and a poison in which a thrombin inhibitor, a thrombin receptor antagonist, a factor Xa inhibitor, a PAI (plasminogen activator inhibitor), a P2Y12 ADP receptor antagonist or a GPIIb/IIIa receptor antagonist are used as rodenticide.

10 Claims, No Drawings

(56) References Cited

FOREIGN PATENT DOCUMENTS

| | | | |
|---|---|---|---|
| WO | WO-99/38827 A1 | 8/1999 | |
| WO | WO-2000/34283 A1 | 6/2000 | |
| WO | WO-01/47919 A1 | 7/2001 | |
| WO | WO-01/64642 A2 | 9/2001 | |
| WO | WO-01/64643 A2 | 9/2001 | |
| WO | WO-0164643 A2 * | 9/2001 | ............ A61K 31/44 |
| WO | WO-01/87879 A1 | 11/2001 | |
| WO | WO-01/96330 A2 | 12/2001 | |
| WO | WO-02/100830 A1 | 12/2002 | |
| WO | WO-03/026652 A1 | 4/2003 | |
| WO | WO-2003/061376 A1 | 7/2003 | |
| WO | WO-03/074056 A1 | 9/2003 | |
| WO | WO-03/084929 A1 | 10/2003 | |
| WO | WO-03/089428 A1 | 10/2003 | |
| WO | WO-2008/037966 A2 | 4/2008 | |
| WO | WO-2008/054795 A2 | 5/2008 | |
| WO | WO-2008/054796 A2 | 5/2008 | |
| WO | WO-2008/128647 A1 | 10/2008 | |
| WO | WO-2008/155022 A1 | 12/2008 | |
| WO | WO-2010030983 A2 * | 3/2010 | ........... C07D 471/04 |
| WO | WO-2010/043322 A1 | 4/2010 | |
| WO | WO-2010/122504 A1 | 10/2010 | |
| WO | WO-2013/092756 A1 | 6/2013 | |
| WO | WO-2014/028318 A1 | 2/2014 | |
| WO | WO-2014/058538 A1 | 4/2014 | |
| WO | 2014080215 A1 | 5/2014 | |
| WO | WO-2014/064272 A1 | 5/2014 | |
| WO | WO-2014/186885 A1 | 11/2014 | |

OTHER PUBLICATIONS

Hirsh et al. "Beyond Unfractionated Heparin and Warfarin: Current and Future Advances"; Circulation, vol. 116, pp. 552-560; Jul. 31, 2007.
Shammas, N.W. Bivalirudin: Pharmacology and Clinical Applications, Cardiovascular Drug Reviews, vol. 23, No. 4, pp. 345-360 (2005).
Center for Drug Evaluation and Research Pharmocology Reviews (FDA), undated but believed to be publically available before Dec. 9, 2016.
Center for Drug Evaluation and Research: Xarelto (Rivaroxaban). Pharmacology/Toxicology Review and Evaluation. 2011. Nr. 022-406. URL: http://www.Accessdata.fda.gov/drugsatfda_docs/nda/2011/022406Orig1s000PharmR.pdf.
Conoie, D., et al., Bioorg. Med. Chem. (2014) 22: 2220-2235.
Hadler, M.R.; Buckle, A.P.: Forty-five Years of Anticoagulant Rodenticides—Past, Present and Future Trends. In: Proceedings of the Fifteenth Vertebrate Pest Conference 1992. University of California: Davis, 1992. S. 149-154-ISSN 0-932857-11-6.
Lo, V.M.H.: Bromadiolone Toxicokinetics: Diagnosis and Treatment Implications. In: Clin. Toxicol., Bd. 46, 2008 S. 709-710, -ISSN 1556-3650.
Thijssen, H.H.W.: Warfarin-Based Rodenticides: Mode of Action and Mechanism of Resistance. In: Pestic. Sci., Bd. 43, 1995, Nr. 1 S. 73-78 ISSN 1096-9063.
Watt, B.E.: Anticoagulant Rodenticides. Tocixol. Rev., Bd. 24, 2005, Nr. 4, S. 259-269. -ISSN 117-2551.
"Abstracts from the 21st International Congress on Thrombosis", Pathophysiol Haemos Thromb, Jan. 1, 2010 (Jan. 1, 2010), Seiten A73-A 116, XP55627042, Basel, Switzerland, DOI: https://doi.org/10.1159/00031 8097, Gefunden im Internet: URL:https://www.karger.com/Article/Pdf/318097; Seite A94: Abstract P486 [gefunden am Sep. 27, 2019].
Jorge Labrador et al: "Management of Bleeding Complications of Dabigatran", Journal of Hematology & Thromboembolic Diseases, Bd. 02, Nr. 01, Jan. 1, 2013 (Jan. 1, 2013), Seiten 1-4, XP55627048, DOI: 10.4172/2329-8790.1000127.
Office Action in corresponding EP Application No. 15 729 428.1 dated Oct. 4, 2019 (no English translation), 8 pages.
Tanikawa et al.; Effectiveness of Difethialone Baits to Warfarin-Resistant and Susceptible Colonies of Roof Rats, *Rattus rattus*, in Japan, Med. Entomol. Zool., vol. 67, No. 4, pp. 355-359, 2006.
Office Action issued in corresponding JP application No. 2019-129110 dated Jun. 5, 2020.
Office Action regarding Mexican Patent Application No. MX/a/2016/016386, dated Jul. 24, 2020.

* cited by examiner

USE AS RODENTICIDES OF COMPOUNDS THAT INHIBIT BLOOD COAGULATION

CROSS-REFERENCE TO RELATED APPLICATIONS

This application is a 371 U.S. National Stage International Application No. PCT/EP2015/063056, filed on Jun. 11, 2015, which application claims the benefit and the priority to German Patent Application No. 10 2014 108 210.9, filed on Jun. 11, 2014. The entire disclosures of the above applications are incorporated herein by reference.

TECHNICAL FIELD

The present disclosure relates to a rodenticide. The rodenticide may be a thrombin inhibitor, a thrombin receptor antagonist, a factor Xa inhibitor, an inhibitor of the plasminogen activator inhibitor, an antagonist of the ADP receptor P2Y12 or an antagonist of the GPIIb/IIIa receptor.

BACKGROUND

The following discussion of the background of the disclosure is provided solely to assist the reader in understanding and is not intended to describe or illustrate the prior art of the present invention.

Wild rodents have always been a serious problem for human health, for property and for the food supply. Even at the time of the pharaohs cats were used against rodents. With respect to the rat alone nearly 70 diseases are known, many of which can be transmitted to humans such as the bubonic plague, typhus or Weil's syndrome. In agriculture wild rodents are an economic threat. Not only the consumption of feed or food, but first of all contamination by fecal pellets and urine causes economic damages. It is estimated that about 10% of the worldwide food supply is consumed solely by rats or suffers damage by rats. Also diseases of farm animals such as foot-and-mouth disease or swine fever are transmitted by wild rodents. In addition, also damages of buildings and equipment are caused, since wild rodents are also able to damage for example water and sewage lines or cables.

The most common method by far to combat wild rodents is the use of food baits—in individual cases even storerooms and/or underground rodent burrows are fumigated. There are special requirements for appropriate active agents for food baits. Rats live in groups, exhibit a distinct social behavior and a good memory. Young males offer themselves as food tasters, while the remaining rats wait for the next hours. If a food taster dies within two days because he has eaten from poisoned bait, his conspecifics will not touch it any more. An active agent suitable as a rodenticide therefore needs to show a correspondingly delayed onset of effect such that conspecifics of the food taster will not be prevented from consuming corresponding bait. The rodenticides used today for food baits are usually anticoagulants because zinc phosphide which has been used previously typically in poisoned wheat, arsenic compounds, barium carbonate, strychnine and white phosphorus are no longer permitted as rodenticides for some time.

In the meantime, however, a significant problem of anticoagulants in addition to persistence and/or bioaccumulation is a widespread resistance in wild rodents. A resistance to an anticoagulant was found already in the 50s. After initially only the first generation anticoagulants such as warfarin and coumatetralyl were affected, later also resistances to the more effective second generation anticoagulants such as difenacoum or bromadiolone were observed. Meanwhile, more than 40% of all rat strains are resistant against the anticoagulants.

Attempts to use other active agents as alternatives were so far unsuccessful. Thus, the derivatives of benzocain (4-aminobenzoic acid ethyl ester), a local anaesthetic, could come into question to combat wild rodents due to the formation of methaemoglobin. Methaemoglobin cannot bind oxygen and changes hemoglobin in its environment in that it is only able to absorb oxygen but can no longer release oxygen. In vivo experiments in rats, however, did not reveal the expected success (Conole, D., et al., Bioorg. Med. Chem. (2014) 22: 2220-2235).

Since 1 Jan. 2013 a distribution of conventional rodenticides in the European Union is basically no longer permitted due to the exceedance of the concentration in the environment predicted as harmless for organisms. Due to the lack of alternatives, however, there is a continuous temporary permission for use by qualified persons.

Thus, there is a need for an effective way to combat wild rodents.

SUMMARY

The present disclosure can be understood in general in that it serves to combat wild rodents. To this end, applications, methods and baits are provided, which are based on the use of active agents disclosed herein. In this case, an active agent used is selected so that it is compatible with the use in a bait in that the onset of the effect of the active agent is adjusted to the behavior of wild rodents. Moreover, an active agent used is generally selected so that it avoids existing resistances and the development of new resistances.

According to a first aspect the use of a thrombin inhibitor, an antagonists of the thrombin receptor, a factor Xa inhibitor, a PAI (plasminogen activator inhibitor) inhibitor or a thrombocytes aggregation inhibitor is provided as a rodenticide.

The thrombin inhibitor is in some embodiments a compound of the following formula or a salt, hydrate or prodrug thereof tolerable for a chosen rodent such as a rat:

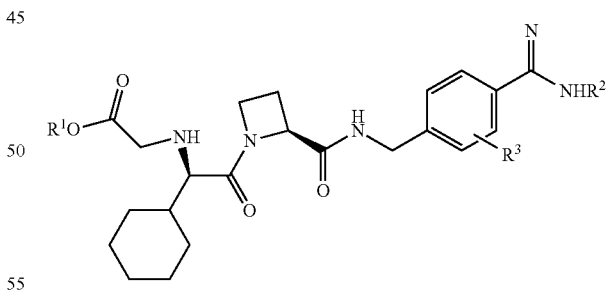

In this formula, $R^1$ is hydrogen, $C_1$ to $C_4$ alkyl $C_1$ to $C_4$ alkylphenyl, $A^1C(O)N(R^4)R^5$ or $A^1C(O)OR^4$. $A^1$ is $C_1$ to $C_5$ alkylene. $R^4$ and $R^5$ are each independently H, $C_1$ to $C_6$ alkyl, phenyl, 2-naphthyl or in the case of $R^1$ as $A^1C(O)N(R^4)R^5$ together with the nitrogen atom to which they are bonded pyrrolidinyl or piperidinyl. $R^2$ is OH, $OC(O)R^6$, $C(O)OR^7$ or $C(O)OCH(R^8)OC(O)R^9$. $R^6$ is a $C_1$ to $C_{17}$ alkyl, phenyl or 2-naphthyl which may all optionally be substituted with a $C_1$ to $C_6$ alkyl or a halogen. $R^7$ is a $C_1$ to $C_3$-alkylphenyl, phenyl or 2-naphthyl which may all optionally be substituted with a $C_{1-6}$ alkyl, $C_{1-6}$ alkoxy, nitro or halogen, or a $C_1$ to $C_{12}$ alkyl, which optionally may be substituted with a $C_{1-6}$ alkoxy, a $C_1$ to $C_6$ acyloxy or a halogen. $R^3$ is H or a $C_1$ to $C_4$ alkyl.

In some embodiments the thrombin inhibitor is a compound of the following formula or a salt, hydrate or prodrug thereof tolerable for a chosen rodent such as a rat:

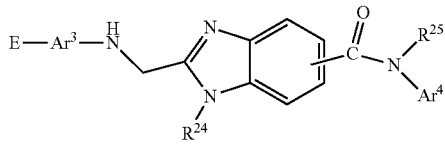

In this formula $R^{24}$ is $C_1$ to $C_6$ alkyl or $C_3$ to $C_7$ cycloalkyl. $Ar^3$ is a phenylene or naphthylene group optionally substituted with a fluorine, chlorine or bromine atom, a trifluoromethyl, $C_1$ to $C_3$ alkyl or $C_1$ to $C_3$ alkoxy group, or a thienylene, thiazolylene, pyridinylene, pyrimidinylene, pyrazinylene or pyridazinylene group optionally substituted in the carbon skeleton with a $C_1$ to $C_3$ alkyl group. $Ar^4$ is a phenyl or 2-pyridinyl group optionally substituted with a fluorine atom. $R^{25}$ is (a) a $C_1$ to $C_3$ alkyl group which may be substituted with a carboxy, $C_1$ to $C_6$ alkoxycarbonyl, benzyloxycarbonyl, methylsulfonylaminocarbonyl or 1H-tetrazol-5-yl group or (b) a $C_{2-3}$ alkyl group substituted with a hydroxy, benzyloxy, carboxy-$C_{1-3}$-alkylamino, $C_1$ to $C_3$-alkoxycarbonyl-$C_{1-3}$-alkylamino, N—($C_{1-3}$-alkyl)-carboxy-$C_{1-3}$-alkylamino or N—($C_{1-3}$-alkyl)-$C_{1-3}$-alkoxycarbonyl-$C_{1-3}$-alkylamino group, wherein in the above mentioned groups the α carbon atom disposed adjacent to the nitrogen atom may not be substituted. E is a cyano or $R^{26}$NH—C(=NH) group wherein $R^{26}$ is a hydrogen atom, a hydroxy group, a $C_1$ to $C_3$ alkyl group or an in vivo cleavable residue (see WO 1998/37075).

In some embodiments the thrombin inhibitor is a compound of the following formula or a salt, hydrate or prodrug thereof tolerable for a chosen rodent such as a rat:

$$\underset{H_2N}{\overset{HN}{\diagdown}}C-\underset{H}{N}CH_2CH_2CH_2\underset{HNSO_2}{\overset{|}{C}}HOR^8$$
$$\phantom{xxxxxxxxxxxxxxxxxxxxxxx}\overset{|}{Ar}$$

In this formula, Ar may be, inter alia, phenyl, quinolinyl, tetrahydroquinolinyl, naphthyl, naphthoquinone or indane. $R^8$ may be a residue of the following formula (see U.S. Pat. No. 4,101,653):

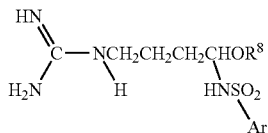

In this formula, $R^9$ is, inter alia, H, a $C_1$ to $C_{10}$ alkyl, a $C_6$ to $C_{10}$ aryl, a $C_7$ to $C_{12}$ aralkyl or 5-indanyl. $R^{10}$ is a $C_1$ to $C_5$ alkyl or alkoxy.

In some embodiments the thrombin inhibitor is a compound of the following formula or a salt, hydrate or prodrug thereof tolerable for a chosen rodent such as a rat:

In this formula, $R^{41}$ may be hydrogen or may form together with $R^{42}$ a $C_3$ to $C_8$ carbocycle. $R^{42}$ may be a halogen, $CF_3$, $C_1$ to $C_6$ alkyl or may form together with $R^{43}$ a $C_3$ to $C_8$ carbocycle or together with $R^{41}$ a $C_3$ to $C_8$ carbocycle. $R^{43}$ may be hydrogen, a halogen, OH, $C_1$ to $C_6$ alkyl or may form together with $R^{43}$ a $C_3$ to $C_8$ carbocycle. $R^{44}$ is a heterocycle, —$(CR^{45}R^{46})NH_2$ or —$(CR^{45}R^{46})_2NH$, wherein $R^{45}$ and $R^{46}$ each independently are H, $C_1$ to $C_6$ alkyl, —$CH_2F$, —$CHF_2$, $CF_3$ or —$CH_2OH$. Q is C (carbon) or Si (silicon).

In some embodiments the thrombin inhibitor is a compound of the following formula or a salt, hydrate or prodrug thereof tolerable for a chosen rodent such as a rat:

$R^{43}$, $R^{44}$, $R^{47}$ and $R^{48}$ and m in this formula are as disclosed in the international patent application WO 2014/028318 and as defined below.

An antagonist of the thrombin receptor antagonist is typically an antagonist of the thrombin receptor PAR-1. In some embodiments the thrombin receptor antagonist is a compound of the following formula or a salt, hydrate or prodrug thereof tolerable for a chosen rodent such as a rat:

In this formula, $Ar^2$ is a phenyl or a morpholino group, wherein a phenyl group may be substituted with a morpholino group, a piperazinyl group, a piperidinyl group or a pyrrolidinyl group. Herein, generally $Ar^2$ and/or a phenyl group included therein may be substituted as described in EP 1813282. $X^1$ in the above formula may be H or a halogen. $R^{11}$ and $R^{12}$ may each independently be H, methoxy or ethoxy.

In some embodiments the thrombin receptor antagonist is a compound of the following formula or a salt, hydrate or prodrug thereof tolerable for a chosen rodent such as a rat:

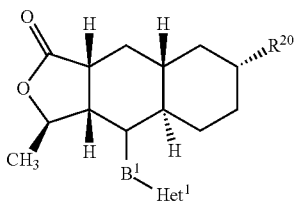

In this formula Het$^1$ is a mono or bicyclic heteroaromatic group of 5 to 10 atoms which includes 1 to 9 carbon atoms and 1 to 4 of the heteroatoms N, O or S. B$^1$ is (CH$_2$) n$_1$, cis- or trans-(CH$_2$)n$_2$CR$^{14}$=CR$^{15}$(CH$_2$)$_{n3}$ or (CH$_2$)n$_2$C≡C(CH$_2$)$_{n3}$, wherein n$_1$ is 0 to 5 and n$_2$ and n$_3$ are each independently 0 to 2. R$^{14}$ and R$^{15}$ are each independently H, C$_1$ to C$_6$ alkyl or a halogen. R$^{20}$ is H, C$_1$ to C$_6$ alkyl, C$_{3-8}$ cycloalkyl, —NHC(O)OR$^{21}$, —NHC(O)R$^{21}$ or another group specified in US 2003/216437. Here, R$^{21}$ is a group such as H, C$_1$ to C$_6$ alkyl, C$_1$ to C$_6$-alkyl-OH, C$_1$ to C$_6$ alkyl, alkoxy or a further group specified in US 2003/216437.

In some embodiments the thrombin receptor antagonist is a compound of the following formula or a salt, hydrate or prodrug thereof tolerable for a chosen rodent such as a rat:

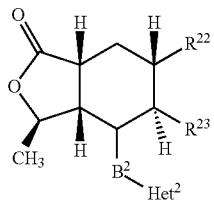

In this formula Het$^2$ is a mono or bicyclic heteroaromatic group of 5 to 14 atoms, which includes 1 to 13 carbon atoms and 1 to 4 heteroatoms. B$^2$ is (CH$_2$)$_{n1}$, —CH$_2$—O—, —CH$_2$—S—, —CH$_2$NR$^{13}$—, —C(O)NR$^{13}$—, —NR$_{13}$C(O)—,

cis- or trans-(CH$_2$)$_{n2}$CR$^{14}$=CR$^{15}$(CH$_2$)$_{n2}$ or (CH$_2$)$_{n2}$C≡C(CH$_2$)$_{n3}$, wherein n1 to n3 are as defined above. R$^{13}$ is H, C$_1$ to C$_6$ alkyl, phenyl, C$_3$ to C$_7$ cycloalkyl, (C$_3$ to C$_7$ cycloalkyl)-(C$_1$ to C$_6$ alkyl), (C$_1$ to C$_6$ alkoxy)-(C$_1$ to C$_6$ alkyl), hydroxy-(C$_1$ to C$_6$ alkyl) and amino-(C$_1$ to C$_6$ alkyl). R$^{14}$ and R$^{15}$ are each independently H, C$_1$ to C$_6$ alkyl or a halogen. R$^{22}$ and R$^{23}$ in this formula are each independently among others H, R$^{16}$(C$_1$ to C$_{10}$ alkyl), R$^{16}$(C$_2$ to C$_{10}$ alkenyl), R$^{16}$(C$_2$ to C$_{10}$ alkynyl), R$^{16}$ (C$_1$ to C$_{10}$ alkyl), heterocycloalkyl, R$^{17}$ aryl, (R$^{17}$ aryl)-(C$_1$ to C$_8$ alkyl), —OH, —OC(O)—R$^{18}$, CO(O)R$^{19}$, —C(O)—R$^{18}$, —C(O)N—R$^{18}$R$^{19}$, —N—R$^{18}$R$^{19}$ or a further group specified in WO 01/96330. Here, R$^{16}$ and R$^{17}$ are each independently H, a halogen, —OH or another group specified in WO 01/96330 and R$^{18}$ and R$^{19}$ are each independently H, C$_1$ to C$_{10}$ alkyl or another group specified in WO 01/96330.

In some embodiments the thrombin receptor antagonist is a compound of the following formula or a salt, hydrate or prodrug thereof tolerable for a chosen rodent such as a rat:

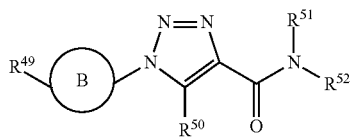

In this formula, B, R$^{49}$, R$^{50}$, R$^{51}$ and R$^{52}$ are as specified in the European patent application EP 1867331 and defined as below.

In some embodiments an inhibitor of factor Xa is a compound of the following formula or a salt, hydrate or prodrug thereof tolerable for a chosen rodent such as a rat:

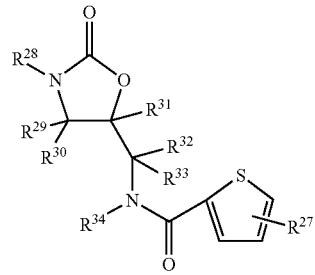

R$^{27}$, R$^{28}$, R$^{29}$, R$^{30}$, R$^{31}$, R$^{32}$, R$^{33}$ and R$^{34}$ in this formula are as specified in international patent application WO 01/47919 and as defined below.

In some embodiments, the inhibitor of factor Xa is an oxazolidinone compound of the following formula, or a salt, hydrate or prodrug thereof tolerable for a chosen rodent such as a rat:

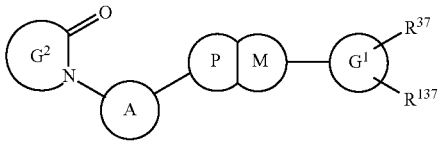

Cycle A in this formula is either a C$_3$ to C$_{10}$ carbocycle which is substituted with 0 to 2 groups R$^{33a}$ or a 5- to 12-membered heterocycle consisting of carbon atoms and 1 to 4 heteroatoms and substituted with 0 to 2 groups R$^{33a}$. The respective heteroatoms of the 5- to 12-membered heterocycle are N, O or S. In the case of the fused rings P and M P is a 5-, 6-, or 7-membered carbocycle or a 5-, 6-, or 7-membered heterocycle consisting of carbon atoms and 1 to 3 heteroatoms. The heteroatoms of the 5-, 6- or 7-membered heterocycle are N, O or S. The ring P is substituted with 0 to 3 groups R$^{34a}$ and 0 to 2 carbonyl groups and includes 0 to 3 double bonds in the cycle. In some embodiments cycle A is a para-phenylene residue.

Herein, R$^{33a}$ may be, for example, H, —OH, F, Cl, Br, I, C$_1$ to C$_4$ alkyl, C$_1$ to C$_4$ alkoxy, CF$_3$, CF$_2$CF$_3$, —CN, nitro amino or amido (see also US 2003/191115 or WO 03/026652). R$^{34a}$ may be, for example, H, —(CH$_2$)$_r$—R$^{35}$, —(CH(CH$_3$))$_r$—R$^{35}$, —(C(CH$_3$)$_2$)$_r$—R$^{35}$, alkoxy, thioalkyl or amino, wherein R$^{34a}$ will not form an N-halo, N—S—, or N—CN-bond and r is one of the numbers 0, 1, 2, 3, 4, 5 and 6. R$^{35}$ may be, inter alia, H, CH$_3$, CH$_2$CH$_3$, CH$_2$CH$_2$CH$_3$, CH(CH$_3$)$_2$, F, Cl, Br, I, —CN, —CHO, CF$_3$, amino, amido, carboxy, sulfoxy or carbonyl. R$^{36}$ may be, inter alia, H, CH(CH$_2$OH)$_2$, CH(CH$_2$OCH$_3$)$_2$, CH(CH$_2$OCH$_2$CH$_3$)$_2$, CH(CH$_2$OCH$_2$CH$_2$CH$_3$)$_2$, CH(CH$_2$OCH$_2$CH$_2$CH$_3$)$_2$, carbonyl, amido, sulfoxy or sulfamido (see also US 2003/191115 or WO 03/026652).

M is a 3- to 10-membered carbocycle or a 4- to 10-membered heterocycle consisting of carbon atoms and 1 to 3 heteroatoms. The heteroatoms of the 4- to 10-membered heterocycle are N, O or S. The ring M is substituted with 0 to 3 groups R$^{34}$ and 0 to 2 carbonyl groups and includes 0 to 3 double bonds in the cycle. Cycle G$^1$ is phenyl, pyridyl, pyrimidyl, pyrazinyl or pyridazonyl. Cycle G$^2$ is a 4- to 8-membered monocyclic or bicyclic hydrocarbon ring including 0 to 2 C=C double bonds. In some embodiments cycle G$^2$ is a 2-oxo-1-piperidinyl residue. In some embodiments cycle G$^2$ is a 2-oxo-1-piperazinyl residue. In some embodiments cycle G$^2$ is a 2-oxo-tetrahydro-1-(2H)-pyrimidinyl residue. In some embodiments cycle G$^2$ is a 2-oxo-1-piperidinyl residue. R$^{37}$ and R$^{137}$ are each independently, inter alia, H, —OH, F, Cl, Br, I, CN, C$_1$ to C$_4$ alkyl, OCH$_3$, OCH$_2$CH$_3$, OCH$_2$CH$_2$CH$_3$, O(CH$_3$)$_2$, OCF$_3$ or amino.

In some embodiments the inhibitor of factor Xa is a compound of the following formula or a salt, hydrate or prodrug thereof tolerable for a chosen rodent such as a rat:

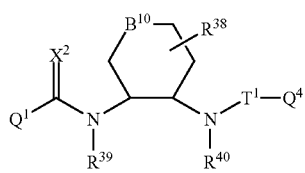

Q$^1$ in this formula is a saturated or unsaturated 5- or 6-membered hydrocarbon ring, a saturated or unsaturated 5- to 7-membered heterocyclic group, a saturated or unsaturated bicyclic or tricyclic fused hydrocarbon group or a saturated or unsaturated bicyclic or tricyclic fused heterocyclic group. In some embodiments Q$^1$ is a 5-methyl-6,7-dihydro-4H-[1,3]thiazolo[5,4-c]pyridine residue. X$^2$ is an oxygen or sulfur atom. B$^{10}$ may be N or CH$_2$. R$^{38}$ may be, inter alia, H, OH, alkoxy, alkyl, alkenyl, alkynyl, halogen, CN, amino, aminoalkyl, acyl, acylamino including acylamino alkyl, carbamoyl, aryl or aralkyl (see EP 2343290). R$^{39}$ and R$^{40}$ are each independently H, OH, an alkyl group or an alkoxy group. Q$^4$ is an aryl group, an arylalkenyl group, an arylalkynyl group, a heteroaryl group, a heteroarylalkenyl group, a saturated or unsaturated bicyclic or tricyclic fused hydrocarbon group or a saturated or unsaturated bicyclic or tricyclic fused heterocyclic group which may be substituted. T$^1$ may be a carbonyl group, a sulfonyl group, —C(=O)—C(=O)—, —C(=O)—C(=O)—NH—, —C(=O)—C(=O)N(alkyl)-, —C(=O)—(C$_1$ to C$_5$ alkylene)-N(alkyl), —C(=O)—(C$_1$ to C$_5$ alkylene)-NH—, —C(=O)—(C$_1$ to C$_5$ alkylene)-C(=O)— or —C(=O)—N=N—.

In some embodiments, the inhibitor of factor Xa is a compound of the following formula or a salt, hydrate or prodrug thereof tolerable for a chosen rodent such as a rat:

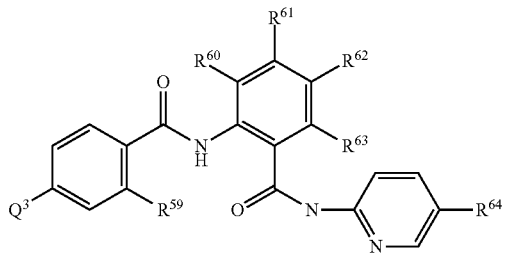

In this formula Q$^3$ may be, inter alia, one of the following groups (see WO 01/64642 and WO 01/64643):

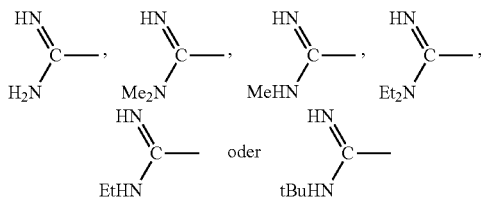

R$^{59}$ is H, F, Cl or Br. R$^{60}$, R$^{61}$, R$^{62}$ and R$^{63}$ are each independently H, F, Cl, Br, Me, NO$_2$, OH, OMe, NH$_2$, NHAc, NHSO$_2$Me, CH$_2$OH and CH$_2$NH$_2$. R$^{64}$ is F, Cl, Br, Me, OH or OMe.

In some embodiments, the inhibitor of factor Xa is a compound of the following formula or a salt, hydrate or prodrug thereof tolerable for a chosen rodent such as a rat:

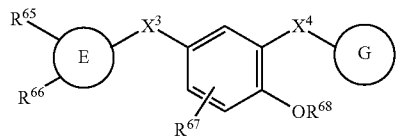

In this formula ring E is a benzene ring or a 5- or 6-membered heterocyclic ring with 1 to 4 heteroatoms which may be N, S or O. X$^3$ and X$^4$ are each independently —C(=O)NH—, C(=O)—N(C$_1$ to C$_6$ alkyl), —NH—C(=O)—, —N(C$_1$ to C$_6$ alkyl)-C(=O)—, —CH$_2$—NH—, —CH$_2$—N(C$_1$ to C$_6$ alkyl)-, —NH—CH$_2$— or —N—(C$_1$ to C$_6$ alkyl)-CH$_2$—. R$^{65}$ is a group including halogen, C$_1$ to C$_6$ alkyl or C$_1$ to C$_6$ alkoxy. R$^{66}$ and R$^{67}$ are each independently H, halogen, CN, NH—SO$_2$—(C$_1$ to C$_6$ alkyl), —NH—CO—(C$_1$ to C$_6$ alkyl), —CO—(C$_1$ to C$_6$ alkyl), —CO—(C$_1$ to C$_6$ alkoxy), —C(O)NH$_2$, C$_1$ to C$_6$ alkyl or C$_1$ to C$_6$ alkoxy or S—(C$_1$ to C$_6$ alkyl). R$^{68}$ is H, SO$_3$H or a sugar residue. Ring G is a piperidine ring or a benzene ring substituted with:

Herein R$^{69}$ is H, C$_1$ to C$_6$ alkyl, —SO$_2$—(C$_1$ to C$_6$ alkyl) or a 5- or 6-membered heterocycle with 1 to 4 heteroatoms which may be N, S or O.

In some embodiments the inhibitor of factor Xa is a compound of the following formula or a salt, hydrate or prodrug thereof tolerable for a chosen rodent such as a rat:

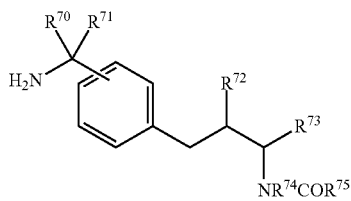

In this formula $R^{70}$ to $R^{75}$ and $R^{52}$ are as specified in the international patent application WO 97/24118 and as defined below.

In some embodiments an inhibitor of factor Xa is a compound of the following formula or a salt, hydrate or prodrug thereof tolerable for a chosen rodent such as a rat:

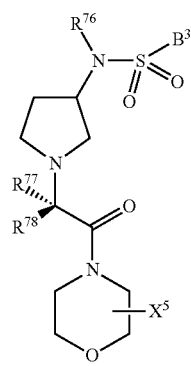

In this formula $X^3$, $B^3$ and $R^{76}$ to $R^{78}$ are as specified in the international patent application WO 02/100830 and as defined below.

In some embodiments the inhibitor of factor Xa is a compound of the following formula or a salt, hydrate or prodrug thereof tolerable for a chosen rodent such as a rat:

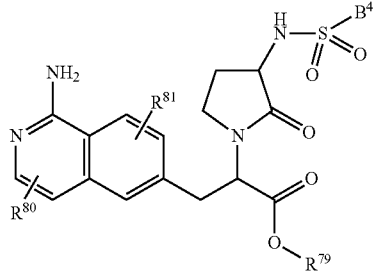

In this formula $B^4$ and $R^{79}$ to $R^{81}$ are as specified in the international patent application WO 2013/092756 and as defined below.

In some embodiments the inhibitor of factor Xa is a compound of the following formula or a salt, hydrate or prodrug thereof tolerable for a chosen rodent such as a rat:

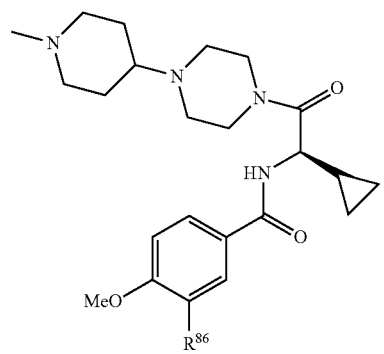

In this formula $R^{86}$ is hydrogen or fluorine.

The PAI inhibitor may be a PAI-1 inhibitor PAI. This is in some embodiments a compound of the following formula or a salt, hydrate or prodrug thereof tolerable for a chosen rodent such as a rat:

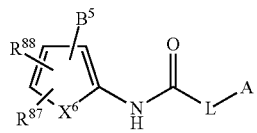

In this formula, $B^5$, $X^6$, $R^{87}$ and $R^{88}$ are as specified in the European patent application EP 2607348 and as defined below.

In some embodiments the PAI-1 inhibitor is a compound of the following formula or a salt, hydrate or prodrug thereof tolerable for a chosen rodent such as a rat:

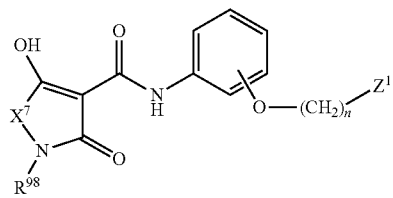

In this formula $X^7$, $Z^1$ and $R^{98}$ are as specified in the British patent application GB 2372986 and as defined below.

A thrombocyte aggregation inhibitor may be an antagonist of the ADP receptor P2Y12 or an antagonist of the GPIIb/IIIa receptor. In some embodiments the antagonist of the ADP receptor P2Y12 is a compound of the following formula or a salt, hydrate or prodrug thereof tolerable for a chosen rodent such as a rat:

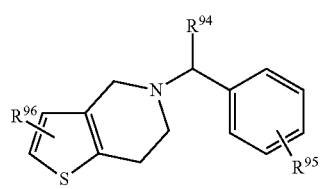

In this formula, $R^{94}$ and $R^{96}$ are as specified in U.S. Pat. Nos. 4,051,141 and 4,591,592 and as defined below.

In some embodiments the antagonist of the ADP receptor P2Y12 is a compound of the following formula or a salt, hydrate or prodrug thereof tolerable for a chosen rodent such as a rat:

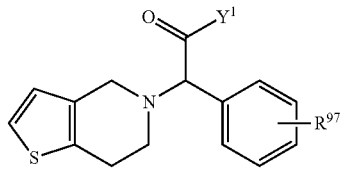

In this formula $Y^1$ and $R^{97}$ are as specified U.S. Pat. No. 4,529,596 and as defined below.

In some embodiments the antagonist of the ADP receptor P2Y12 is a compound of the following formula or a salt, hydrate or prodrug thereof tolerable for a chosen rodent such as a rat:

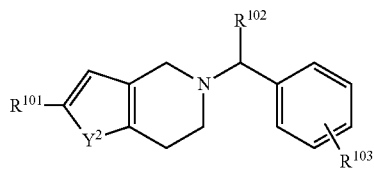

In this formula, $Y^2$, $R^{102}$ and $R^{103}$ are as specified in U.S. Pat. No. 5,288,726 and as defined below.

In some embodiments the antagonist of ADP receptor P2Y12 is a compound of the following formula or a salt, hydrate or prodrug thereof tolerable for a chosen rodent such as a rat:

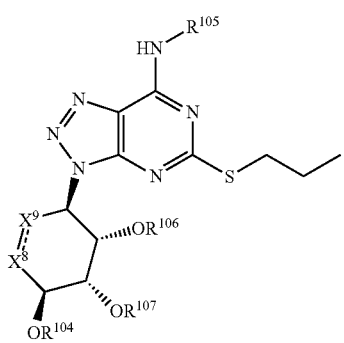

In this formula $X^8$, $X^9$, and $R^{104}$ to $R^{107}$ are as specified in the international patent application WO 2008/054796 and as defined below.

In some embodiments the antagonist of the ADP receptor P2Y12 is a compound of the following formula or a salt, hydrate or prodrug thereof tolerable for a chosen rodent such as a rat:

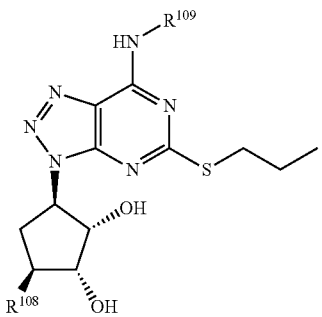

In this formula $R^{108}$ and $R^{109}$ are as specified in the international patent application WO 2008/054 795 and as defined below.

In some embodiments the antagonist of the ADP receptor P2Y12 is a compound of the following formula or a salt, hydrate or prodrug thereof tolerable for a chosen rodent such as a rat:

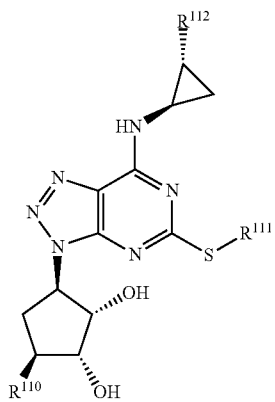

In this formula $R^{110}$ to $R^{112}$ are as specified in the international patent application WO 2000/34283 and as defined below.

In some embodiments the antagonist of the ADP receptor P2Y12 is a compound of the following formula or a salt, hydrate or prodrug thereof tolerable for a chosen rodent such as a rat:

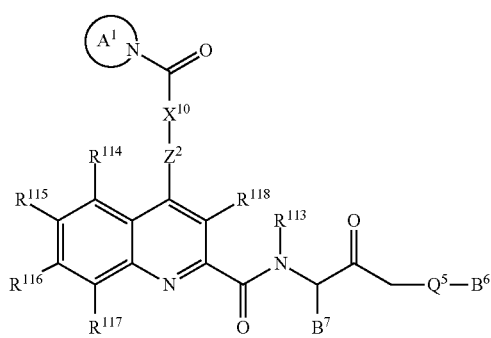

In this formula $X^{10}$, $Z^2$, $A^1$, $B^6$, $B^7$, $Q^5$, and $R^{113}$ to $R^{118}$ are as specified in the international patent application WO 2008/128647 and as defined below.

In some embodiments, the antagonist of the ADP receptor P2Y12 is a compound of the following formula or a salt, hydrate or prodrug thereof tolerable for a chosen rodent such as a rat:

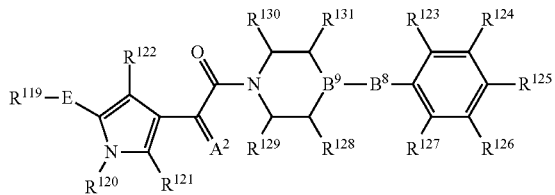

In this formula E, $A^2$, $B^8$, $B^9$ and $R^{119}$ to $R^{131}$ are as specified in the international patent application WO 2008/155022 and as defined below.

In some embodiments the antagonist of the ADP receptor P2Y12 is a compound of the following formula or a salt, hydrate or prodrug thereof tolerable for a chosen rodent such as a rat:

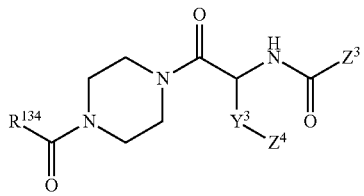

In this formula, $Y^3$, $Z^3$, $Z^4$ and $R^{134}$ are as specified in the international patent application WO 2010/122504 and defined below.

In some embodiments the antagonist of the GPIIb/IIIa receptor is a compound of the following formula or a salt, hydrate or prodrug thereof tolerable for a chosen rodent such as a rat:

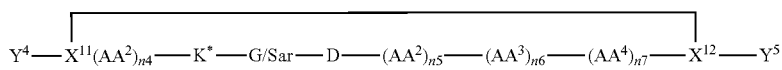

In this formula $Y^4$, $Y^5$, $X^{11}$, $X^{12}$, $K^*$, $AA^1$ to $AA^4$ and $n_4$ to $n_7$ are as specified in the international patent application WO 90/15620 and as defined below.

In some embodiments the antagonist of the GPIIb/IIIa receptor is a compound of the following formula a salt, hydrate or prodrug thereof tolerable for a chosen rodent such as a rat:

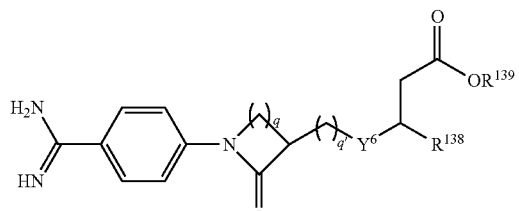

In this formula $Y^6$ is

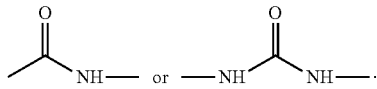

The variable q is one of the integers 2 and 3 and q' is an integer from 0 to 4. $R^{138}$ is H, $C_1$ to $C_6$ alkyl, $C_1$ to $C_8$ alkoxy, $C_1$ to $C_8$ alkoxycarbonyl, $C_2$ to $C_6$ alkenyl, $C_2$ to $C_6$ alkynyl, cycloalkyl and aryl. $R^{139}$ is $C_1$ to $C_6$ alkyl, $C_2$ to $C_6$ alkenyl, $C_2$ to $C_6$ alkynyl, alkoxycarbonyloxyalkyl, $C_3$ to $C_6$ cycloalkyl or aryl.

In some embodiments the antagonist of the GPIIb/IIIa receptor is a compound of the following formula or a salt, hydrate or prodrug thereof tolerable for a chosen rodent such as a rat:

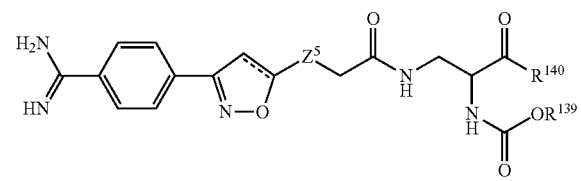

In this formula $Z^5$, $R^{139}$ and $R^{140}$ are as specified in the international patent application WO 95/14683 and as defined below.

In some embodiments the antagonist of the GPIIb/IIIa receptor is a compound of the following formula or a salt thereof tolerable for a chosen rodent such as a rat:

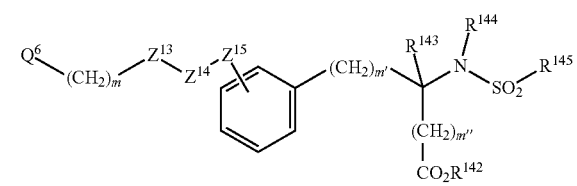

In this formula $Q^6$, m, m', m", $Z^{13}$, $Z^{14}$, $Z^{15}$, $R^{142}$, $R^{143}$, $R^{144}$ and $R^{145}$ are as specified in the international patent application WO 93/19046 and as defined below.

In some embodiments the antagonist of the GPIIb/IIIa receptor is a compound of the following formula or a salt thereof tolerable for a chosen rodent such as a rat:

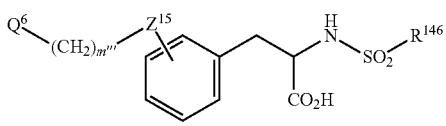

In this formula $Q^6$ is a six-membered saturated heterocyclic ring having 1 or 2 N-atoms as heteroatoms. The variable m''' is an integer from 2 to 6. $Z^{15}$ may be CO—NH or NH—CO. $R^{146}$ is aryl, $C_1$ to $C_{10}$ alkyl or $C_4$ to $C_{10}$ aralkyl.

In some embodiments the antagonist of the GPIIb/IIIa receptor is a compound of the following formula or a salt, hydrate or prodrug thereof tolerable for a chosen rodent such as a rat:

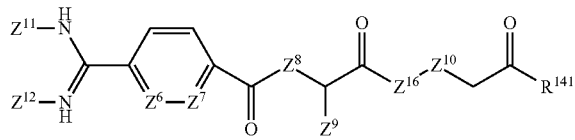

In this formula one of $Z^6$ and $Z^7$ is CH and the other is CH, $C_1$ to $C_8$ alkyl, $C_1$ to $C_8$ alkoxy or N. $Z^8$ is NH, $C_1$ to $C_8$-alkyl-N or $C_1$ to $C_8$-Alkoxy-($C_1$ to $C_8$ alkyl)-N. $Z^9$ is H or $C_1$ to $C_8$ alkyl optionally substituted with OH, SH, $CONH_2$, CONH—$C_{1-8}$-alkyl, $C_1$ to $C_8$ alkylthio, aryl, $NH_2$, NH—($C_{1-8}$ alkyl), N($C_{1-8}$ alkyl)($C_{1-8}$ alkyl) or O—($C_{1-8}$ alkyl).

$Z^{10}$ is O, $CH_2$, NH, acyl-N or $C_{1-8}$-alkyl-OC(O)N. $Z^1$ and $Z^{12}$ are H, $C_1$ to $C_8$ alkyl, OH, $C_1$ to $C_8$ alkoxy, $C_{1-8}$-alkoxy-$C_{1-8}$-alkyl, carboxy-$C_{1-8}$-alkyl, P(O)(O—$C_{1-8}$-alkyl)$_2$, C(O)O—$C_{1-8}$-alkyl, OC(O)—$C_{1-8}$-alkyl, OC(O)O—$C_{1-8}$-alkyl or C(O)S—$C_{1-8}$-alkyl, wherein at least one of $Z^{11}$ and $Z^{12}$ is H (hydrogen) or $Z^1$ and $Z^{12}$ together with the N atoms to which they are bonded, are a (5,5-dimethyl or 5-oxo)-4,5-dihydro-1,2,4-oxadiazol-3-yl group. $Z^{16}$ is a 1,4-piperidinylene bonded to the keto group via the N atom or 1,4-phenylene optionally substituted with $C_1$ to $C_8$ alkyl, $C_1$ to $C_8$ alkoxy, $OCH_2COOH$ or $OCH_2COO$—($C_{1-8}$ alkyl). $R^{141}$ is $NH_2$, NH—($C_{1-8}$ alkyl), NH—($C_{1-8}$ alkyl)COOH, NH—($C_{1-8}$ alkyl)-COO—$C_{1-8}$ alkyl), $C_1$ to $C_8$ alkyloxy or $C_1$ to $C_8$ alkenyloxy.

According to a second aspect the use of a combination of two or more active agents according to the first aspect is provided as a rodenticide. The combination of the use according to the second aspect may comprise two or more of the active agents used according to the first aspect. In some embodiments the combination substantially consists of two or more of the active agents used according to the first aspect.

In some embodiments the combination of the use of the second aspect includes a thrombin inhibitor and a thrombin receptor antagonist. In some embodiments the combination substantially consists of a combination of a thrombin inhibitor and einemthrombin receptor antagonist. In some embodiments the combination comprises a thrombin inhibitor and a factor Xa inhibitor. In some embodiments the combination substantially consists of a thrombin inhibitor and a factor Xa inhibitor. In some embodiments the combination comprises a thrombin inhibitor and a PAI inhibitor. In some embodiments the combination substantially consists of a thrombin inhibitor and a PAI inhibitor. In some embodiments the combination comprises a thrombin inhibitor and an antagonist of the P2Y12 receptor. In some embodiments the combination substantially consists of a thrombin inhibitor and an antagonist of the P2Y12 receptor. In some embodiments the combination comprises a thrombin inhibitor and an antagonist of the GPIIb/IIIa receptor. In some embodiments the combination substantially consists of a thrombin inhibitor and an antagonist of the GPIIb/IIIa receptor.

In some embodiments the combination used comprises a thrombin receptor antagonist and a factor Xa inhibitor. In some embodiments the combination substantially consists of a thrombin receptor antagonist and a factor Xa inhibitor. In some embodiments the combination comprises a thrombin receptor antagonist and a PAI inhibitor. In some embodiments the combination substantially consists of a thrombin receptor antagonist and a PAI inhibitor. In some embodiments the combination comprises a thrombin receptor antagonist and a P2Y12 receptor antagonist. In some embodiments the combination substantially consists of a thrombin receptor antagonist and a P2Y12 receptor antagonist. In some embodiments the combination comprises a thrombin receptor antagonist and a GPIIb/IIIa receptor receptor antagonist. In some embodiments the combination substantially consists of a thrombin receptor antagonist and a GPIIb/IIIa receptor receptor antagonist.

In some embodiments, the combination of the use comprises a factor Xa inhibitor and a PAI inhibitor. In some embodiments the combination consists substantially of a factor Xa inhibitor and a PAI inhibitor. In some embodiments the combination comprises a factor Xa inhibitor and a P2Y12 receptor antagonist. In some embodiments the combination substantially consists of a factor Xa inhibitor and a P2Y12 receptor antagonist. In some embodiments the combination comprises a factor Xa inhibitor and a GPIIb/IIIa receptor antagonist. In some embodiments the combination substantially consists of a factor Xa inhibitor and a GPIIb/IIIa receptor antagonist. In some embodiments the combination comprises a PAI-inhibitor and an antagonist of the ADP receptor P2Y12. In some embodiments the combination substantially consists of a PAI inhibitor and an antagonist of the ADP receptor P2Y12. In some embodiments the combination comprises a PAI inhibitor and an antagonist of the GPIIb/IIIa receptor. In some embodiments the combination substantially consists of a PAI inhibitor and an antagonist of the GPIIb/IIIa receptor. In some embodiments the combination comprises an antagonist of the ADP receptor P2Y12 and an antagonist of the GPIIb/IIIa receptor. In some embodiments, the combination substantially consisting of an antagonist of the ADP receptor P2Y12 and an antagonist of the GPIIb/IIIa receptor.

According to a third aspect the use of a composition as a rodenticide is provided. The composition may comprise an active agent according to the first aspect and a carrier tolerable for rodents. The composition may also comprise a combination according to the second aspect and a carrier tolerable for rodents.

According to a fourth aspect a harmful rodent bait is provided. The harmful rodent bait is used to combat harmful rodents. This harmful rodent bait can also be used for controlling a manifestation with harmful rodents. The harmful rodent bait includes one or more of the active agents described herein. Such a harmful rodent bait typically includes one or more compounds from the classes of thrombin inhibitors, thrombin receptor antagonists, factor Xa inhibitors, PAI inhibitors, antagonists of the ADP receptor P2Y12 and/or antagonists of the GPIIb/IIIa receptor. The harmful rodent bait may include one or more of the compounds disclosed herein. The harmful rodent bait may include a composition according to the second aspect.

According to a fifth aspect the present disclosure relates to a method for combating harmful rodents. The method involves the feed of an effective amount of an active agent described herein to a harmful rodent. In some embodiments the harmful rodent is fed with an effective amount of a composition according to the second aspect. This method may involve the application of a harmful rodent bait according to the third aspect. This method may be a method for controlling a manifestation of rodents.

The summary described in the foregoing is not limiting and other features and advantages of the compositions, applications and methods described herein will be apparent from the following detailed description and the claims.

DETAILED DESCRIPTION

Unless otherwise stated or another meaning is clearly apparent from the context, the following terms and expressions when used in this document including the description and the claims have the meanings specified below.

The term "aliphatic" as used in this document depending on context may relate to both a chemical group and a chemical compound as a whole. The term means, unless otherwise stated, the presence of a straight or branched hydrocarbon chain which may be saturated or mono or polyunsaturated and may include one or more heteroatoms. Heteroatoms are atoms others than carbon atoms such as N, O, S, Se or Si. An unsaturated aliphatic group includes one or more double and/or triple bonds, i.e. alkene and/or alkyne groups. The branches of the hydrocarbon chain may include linear chains as well as non-aromatic cyclic elements. Unless otherwise stated, the hydrocarbon chain may have any desired length and may include any desired number of branches. In typical embodiments, the hydrocarbon backbone includes up to about 20 carbon atoms, for example 1 to about 15 carbon atoms. In some embodiments the hydrocarbon backbone includes 2 to about 10 carbon atoms. Examples of alkyl groups are methyl, ethyl, propyl, butyl, pentyl, hexyl, heptyl, octyl (capryl), nonyl (pelargonyl), decyl (caprine), dodecyl (lauryl), tetradecyl (myristyl), hexadecyl (cetyl), the n-isomers of these groups, isopropyl, isobutyl, isopentyl, sec-butyl, tert-butyl, neopentyl or 3,3-dimethylbutyl.

The term "cycloaliphatic" is equivalent to alicyclic and relates, unless otherwise stated, to a non-aromatic cyclic chemical structure, typically a cyclic hydrocarbon residue. Such a ring structure may be saturated. Such a ring structure may include one or more double bonds. This cyclic structure may include multiple closed rings which may be fused such as in decalin. A cycloaliphatic group and a cycloaliphatic molecule may be substituted with one or more non-aromatic rings, chain elements or functional groups. If a cycloaliphatic structure is substituted with an aromatic this group or this molecule will also be referred to as arylalicyclic. Unless otherwise stated, the backbone of a cycloaliphatic hydrocarbon unit in a ring may include any number of non-aromatic cyclic or chain elements. A backbone of a cycloaliphatic hydrocarbon unit may in some embodiments include 3, 4, 5, 6 or 7 backbone atoms in a ring. Illustrative examples of such units are cyclopentyl, cyclohexyl, cycloheptyl, or cyclooctyl. A cycloaliphatic hydrocarbon unit in addition may include heteroatoms, both within the backbone and in substituents such as in a side chain or a cyclic substituent. Examples of such heteroatoms are N, O, S, Se or Si.

The term "aromatic" as used in this document relates to a planar cyclic hydrocarbon unit, both as a complete molecule and as a chemical group or as a residue. An aromatic hydrocarbon unit is characterized by conjugated double bonds. An aromatic unit may comprise a single ring or a plurality of fused or covalently linked rings. Illustrative examples of corresponding units are cylcopenta-dienyl, phenyl, napthalenyl, [10]annulenyl-(1,3,5,7,9-cyclodecapentaenyl), [12]annulenyl, [8]annulenyl, phenalene (perinaphthen), 1,9-dihydropyrene or chrysene (1,2-benzophenanthrene). A single aromatic ring typically has 5, 6, 7 or 8 backbone atoms. An aromatic unit may include substituents such as functional groups or aliphatic groups. The term "aromatic" also includes "arylalkyl" such as a benzyl unit. An aromatic hydrocarbon unit in addition may comprise heteroatoms both within the backbone and in substituents such as a side chain. Examples of such heteroatoms are N, O, S or Se. Examples of heteroaromatic hydrocarbon units are furanyl, thiophenyl, naphthyl, naphthofuranyl, anthrathiophenyl, pyridinyl, pyrrolyl, quinolinyl, naphthoquinolinyl, quinoxalinyl, indolyl, benzindolyl, imidazolyl, oxazolyl, oxoninyl, oxepinyl, benzoxepinyl, azepinyl, thiepinyl, selenepinyl, thioninyl, azecinyl (azacyclodecapentaenyl), diazecinyl, azacyclododeca-1,3,5,7,9,11-hexaen-5,9-diyl, azozinyl, diazocinyl, benzazocinyl, azecinyl, azaundecinyl, thia[11]annulenyl, oxacyclo-trideca-2,4,6,8,10,12-hexaenyl or triazaanthracenyl units.

The term "arylaliphatic" refers to hydrocarbon units including one or more aromatic units and one or more aliphatic units, wherein one or more aromatic units are bonded to one or more aliphatic units. In some embodiments a hydrocarbon backbone includes in an aromatic ring of an arylaliphatic unit 5, 6, 7 or 8 backbone atoms. Examples of arylaliphatic units include 1-ethyl-naphthalene, 1,1'-methylene-bis-benzene, 9-isopropylanthracen, 1,2,3-trimethyl-benzene, 4-phenyl-2-buten-1-ol, 7-chloro-3-(1-methylethyl)-quinoline, 3-heptyl-furan, 6-[2-(2,5-diethyl-phenyl)ethyl]-4-ethylquinazoline or 7,8-dibutyl-5,6-diethyl-isoquinoline.

The terms "treating" and "treatment" as used in this document relate to both prophylactic or preventive measures and a measure that develops a therapeutic effect. "Treating" and "treatment", for example, refer to preventing, slowing, reducing or at least partially alleviating or cancelling an abnormal, including a pathological condition in an organism of a subject. The term "abnormal condition" refers generally to the function of a cell, an organ or a tissue in an organism which differs from the usual function in a corresponding organism. An abnormal condition may, for example, be associated with an altered cell proliferation, cell differentiation or survival of a cell. Those requiring treatment include subjects which are already affected by a disease and/or disorder as well as those who are prone to the occurrence of the disease/disorder or those in which the occurrence of the disease/disorder is to be prevented. Usually a treatment reduces, stabilizes or prevents the progression of a symptom that is associated with the presence and/or progression of a disease or pathological condition. The term "treating" typically refers to a method in which a compound is administered to cells or tissue of a subject.

The terms "combatting" and "combat" as used in this document relate to a measure which affects that an unwanted organism, in this case a harmful rodent, is killed. "Combatting" has in some embodiments a meaning corresponding to the term "controlling". "Combatting" and "combat", for example, mean invoking, accelerating, supporting, including enabling the occurrence of an abnormal, including a pathological condition in an organism of a harmful rodent. Typically, "combatting" includes a method and/or use in which a compound is supplied to cells or tissue of a harmful rodent. The terms "combatting" and "combat" in addition generally include those features of the method and/or use which make it possible that a corresponding compound can be supplied to cells or tissue of a harmful rodent. In the methods and uses disclosed herein such features that allow an administration are based typically on the time frame of the onset of the effect of the active agent used in such a method and/or use.

The term "consisting of" as used in this document means inclusive and limited to that what follows term "consisting of". The term "consisting of" thus indicates that listed elements are required or necessary and that no other elements may be present. The term "substantially consisting of" is to be understood in that any elements which are defined following the term are included and that other elements, for example in a sample or a composition, may be present which do not alter the activity or effect that are specified for the corresponding elements in this document, i.e. do not interfere and do not contribute to the activity or effect. As an example, for a composition effective as a rodenticide the term means that it may include carrier agents/excipients if it substantially consists of one or more active agents. Thus, the term "substantially consisting of" indicates that the defined elements are required or necessary, but other elements are optional and may be present or not depending on whether they are of concern for the effect or efficacy of the defined elements or not.

The word "about" if used herein refers to a value that for a certain value as determined by one ordinary skilled in the art lies within an acceptable error margin. This will be partly dependent on how the respective value has been determined or measured, i.e. on limitations of the measurement system. "About", for example, may indicate within a standard deviation of 1 or more depending on the use in the respective area. The term "about" is also used to indicate that the amount or value may be the specified value or some other value that is approximately equal. The term is intended to express that similar values promote equivalent results or effects as disclosed in this document. In this context "about" may refer to a range of up to 10% above and/or below a certain value. In some embodiments "about" refers to a range of up to 5% above and/or below a certain value, such as 2% above and/or below a certain value. In some embodiments "about" refers to a range of up to 1% above and/or below a certain value. In some embodiments "about" refers to a range of up to 0.5% above and/or below a certain value. In one embodiment "about" refers to a range of up to 0.1% above and/or below a certain value.

The conjunctional term "and/or" between several elements, when used herein, is to be understood as including both individual and combined options. For example, if two elements are linked by "and/or" the first option relates to the use of the first element without the second. A second option relates to the use of the second element without the first. A third option relates to the use of the first and the second member together. It is to be understood that any of these options falls within the meaning of the term and thus satisfies the conditions of the term "and/or" as used in this document.

The term "low molecular weight" in connection with a compound, for example, a low molecular weight thrombin inhibitor, refers to a molecular mass which is in the range of up to about 5000 Da. In some embodiments the mass of a low molecular weight compound may be in the range of up to about 2000 Da.

The term "prodrug" indicates a compound which in the organism of an animal such as a rodent is converted into its active form which exhibits the desired pharmacological or toxicological effect—for example, by enzymatic, mechanical and/or electromagnetic means. A "prodrug" is thus a derivative of the active agent which itself is still pharmacologically/toxicological inactive or exhibits a smaller effect compared to the final active agent. Prodrugs are typically used to overcome challenges in terms of stability, specificity, toxicity or bioavailability. A prodrug may for example have an advantageous solubility, tissue compatibility or release compared to the final active agent. For example, a prodrug compared to the final active agent may carry a protecting group at a functional group that is removed enzymatically in vivo by solvolysis. As another example, a prodrug can be converted in vivo via an oxidation and/or a phosphorylation or glycosylation into a final active agent. In this case one or more enzymes and/or gastric acid may be involved. Examples of typical prodrugs are carboxylic acid derivatives such as an ester which is obtained by reacting a parent acid compound with a suitable alcohol such as a $C_{1-6}$ alcohol, an amide which is obtained by reacting a parent acid compound with a suitable amine such as a $C_{1-6}$ amine or an acylated basic group such as a $C_{1-6}$ acylamine which is obtained by reacting a base containing parent compound with a carboxylic acid compound.

The term "administering" as used herein refers to any kind of transferring, supplying, inserting or transporting a material such as a compound e.g. a pharmaceutical compound or another reagent such as an antigen in/to a subject. Administering forms include oral administration, topical (local) contact, intravenous, intraperitoneal, intramuscular, intranasal and subcutaneous administration. In the applications and methods described herein the administration to rodents is typically orally. Administration "in combination with" one or more other substances such as one or more pharmaceutical active agents includes simultaneous, i.e. concurrent, and consecutive administration in any order. Thus, in applying a bait as administering the social behavior of rodents is considered in that with respect to the consumption the time and order within the group is left to the rodents.

A salt tolerable for a rodent or an administration form tolerable for a rodent is a salt or an administration form that causes no immediate negative effects in a rodent. Such a salt or such an administration form therefore does not enable the rodent, in particularly the rat, to infer potential adverse effects of a bait or a different kind of supply of an active agent. In some embodiments a salt tolerable for a rodent or an administration form tolerable for a rodent are a pharmaceutically tolerable salt or a pharmaceutically tolerable administration form.

An "effective amount" of an object, such as a compound, is an amount—either as a single dose or as a part of a series of doses—which results in the desired therapeutic or toxic effect for the used dosage schedule, that is, affects a particular physiological object such as inhibiting an enzyme. In the present case, an intended object may be the death of a rodent. The dosage depends on several factors, including the type and size of the rodent and the type of offering or administration and other factors.

Singular forms such as "a", "an" or "the" include the plural form when used in this document. For example, a reference to "a cell" includes both an individual cell and a plurality of cells. In some cases the term "one or more" is explicitly used in order to indicate in the respective case that the singular form includes the plural form. Such explicite indications will not limit the general meaning of the singular form. Unless otherwise stated, the term "at least" when preceding a series of elements, is to be understood to refer to each of these elements. The term "at least one" includes, for example, two, three, four or more elements.

The term "at least substantially consisting of", if used herein, is to be understood as including the terms "consisting substantially of" and "consisting of". The term "at least substantially consisting of" thus indicates that elements listed in some embodiments are required or necessary and that no other elements may be present. The term "at least substantially consisting of" therefore also indicates that elements listed in some embodiments are required or necessary but that other elements are optional and may be present or not, depending on whether they are relevant for the effect or efficacy of the defined elements or not. It is further to be understood that minor variations above and below a range specified herein may be used in order to achieve a substantially similar result as with a value which is within the range. Unless otherwise stated the disclosure of a range is also provided as a continuous range including all individual values which lie between the minimum and the maximum value.

A compound disclosed herein, a combination disclosed herein, a composition disclosed herein, a use disclosed herein and a method disclosed herein typically intervenes in the processes of blood coagulation. Here, in general, the blood coagulation is inhibited. This effect is known in principle and is therapeutically used for the prevention of blood clots. Dreaded consequences of blood clots are, for example, heart attack, stroke or pulmonary embolism. Such a therapeutic effect is accompanied by the risk of bleedings. This drug effect which is an undesirable side effect in humans, however, is a welcome effect in combatting rodents, in particular rats, in the form of a not immediately occurring, but fatal bleeding.

In the hemostasis initially platelets (thrombocytes) adhere to tissue structures, aggregate together and form a hemostatic clot. Without being bound to any particular theory the effect in a use and a method according to the present disclosure may be understood in that this aggregation and thus the formation of a hemostatic clot is reduced and optionally omitted. According to this understanding an adhesion of the platelets is usually not the point of attack of a use disclosed herein and a method disclosed herein.

In the hemostasis activated platelets adhere, degranulate and secrete coagulation promoting microparticles as well as ADP and thromboxane A2. These bind to their platelets receptors and lead to the activation of additional platelets. The aggregation of the platelets to each other is facilitated by the binding of fibrinogen and $Ca^{2+}$ to receptors on the platelets. In the secondary phase, the fibrin formation phase, formed fibrin solidifies the hemostatic clot. The actual blood coagulation is therefore the conversion of soluble fibrinogen within insoluble fibrin. The activation of the blood coagulation leads to a prothrombinase complex from factor Xa, factor Va, phospholipid and $Ca^{2+}$. The key enzyme in the blood coagulation is the protease thrombin. Thrombin catalyzes the conversion of fibrinogen to fibrin by separating the fibrinopeptides A and B from fibrinogen. The resulting fibrin monomers aggregate to polymers.

For poisoning rodents such as a rat, mouse, vole, rabbit, opossum and ground squirrel so far, among others, warfarin, cumatetralyl (also: coumatetralyl), diphacinone, flocumafen (also: flocoumafen), brodifacoum and bromadiolone are used. Warfarin is (RS)-4-hydroxy-3-(3-oxo-1-phenyl-butyl)-coumarin and cumatetralyl is 4-hydroxy-3-(1,2,3,4-tetrahydro-1-naphthyl)-coumarin. Difenacoum is 3-(3-biphenyl-4-yl-1,2,3,4-tetrahydro-1-naphthyl)-4-hydroxycoumarin, flocumafen is 4-hydroxy-3-[3-(4'-trifluoromethylbenzyl-oxyphenyl)-1,2,3,4-tetrahydro-1-naphtyl]coumarin, brodifacoum is 3-(3-(4'-bromo-1,1'-biphenyl-4-yl)-1,2,3,4-tetrahydro-1-naphthyl)-4-hydroxycoumarin, bromadiolone is 3-[3-(4'-bromobiphenyl-4-yl)-3-hydroxy-1-phenylpropyl]-4-hydroxycoumarin. It is therefore a matter of coumarins. Coumarins, derivatives of 4-hydroxy-coumarin or 1,3-indandione are vitamin K antagonists by blocking the enzymes vitamin K quinone reductase and vitamin K epoxide reductase.

Vitamin K is required as a cofactor for the post-translational γ-carboxylation of N-terminal glutamic acid residues in a number of proteins including the coagulation factors II, VII, IX and X as well as the coagulation modulators protein C and protein S. Coumarins, such as phenprocoumon (Marcumar®, Falithrom®) or warfarin (Couxnadin®) are thus indirectly acting anticoagulants. According to the different biological half-lives of vitamin K dependent coagulation factors the maximum coumarin effect is manifest only after a considerable delay, in humans after 24 to 36 hours. The risk in the use of warfarin in human patients is its narrow therapeutic margin. In the case of over dosage bleedings in the gastrointestinal tract, brain, adrenal gland or retina occur. The optimal dose is preferably determined individually. When used as a rodenticide such considerations play no role, rather it is sought to achieve a lethal dose (LD).

Phenprocoumon is used in humans to prevent thrombus formation and embolism resulting therefrom, for example for thrombosis relapse prevention or in the case of atrial fibrillation. A dreaded unwanted effect when used in humans are severe bleedings, which can occur especially in then case of overdosing and simultaneous hypertension.

Two other known rodenticides are difenacoum (2-(diphenylacetyl)-1H-inden-1,3(2H)-dione)pindon(2-pivaloyl-1,3-indandione). As indandione compounds they act like a coumarin as vitamin K antagonists.

The efficacy of coumarines and indandione compounds is based on the slow accumulation of the substance in the animal body and the resulting increasing anticoagulation and that is why the animals slowly bleed to death internally. Especially the only progressive on setting toxic effect made the coumarins and indandione compounds so particularly successful as harmful rodent poisons.

When intaking a bait mixed with a coumarin or a indandione compound the rats initially remain alive and show no symptoms of poisoning. A wild rodent such as a rat, which regularly feeds on the bait food, thus does not die immediately or within a short delay after bait consumption but remains alive a few more days before it finally bleeds to death internally. Thus, this is also valid for a "food taster rat". The protective social behavior of rats is thus effectively bypassed and the pesticide (coumarin/indanedione) containing food bait is not avoided by the rat population. Rather, the whole rat population feeds on the easy available bait which leads to a delayed but complete elimination of the entire rat population. Regularly offered baits, which have a coumarin or indandione compound, in this way have led reliable to a safe elimination of large rat populations.

In the meantime, a strong resistance to coumarin and indandione compounds has to be expected in almost one-third to half of the global rat strains due to the widespread use of coumarin and indandione compounds. This resistance is based on a coexisting alternative thiol (SH)/disulfide (S—S) dependent reduction path of vitamin K. Unlike in humans, in which the thiol dependent reduction path is usually formed very insufficiently, today there is a variety of rat strains which are able to activate this alternative reduction path of vitamin K. During long-term use of coumarins as pesticides the thiol dependent reduction path presents a significant selective advantage for the rat. Over the many decades in which coumarin baits were used very efficiently, in particular the coumarin resistant strains were able to grow undisturbed, so that now a significant selection of these coumarin resistant rat strains has arisen.

The uses and methods disclosed herein are based on the observation that in addition to vitamin K antagonists further active agents exhibiting an antithrombotic effect have a sufficiently delayed onset of action to come in question as a rodenticide.

The uses and methods disclosed herein are in some embodiments selective for rodents. The underlying compounds do not show the same fatal antithrombotic effect on, for example, birds in these embodiments.

In some embodiments the uses and methods disclosed herein relate preferably to the species of the rat (*Rattus*) to which, for example, the black rat (*Rattus Rattus*), *Rattus andamanensis*, the brown rat (*Rattus norvegicus*), the ricefield rat (*Rattus argentiventer*) or the pacific rat (*Rattus exulans*) belong. The underlying compounds in these embodiments do not show the same fatal antithrombotic effect in, for example, mice or hamsters. In some embodiments the uses and methods disclosed herein are selective for the species of the rat (*Rattus*). For example, the uses of inhibitors of factor Xa disclosed herein such as a compound according to the international patent applications WO 01/47919, WO 03/026652 or WO 01/64642 and WO 01/64643 are typically selective for the species *Rattus*. Likewise, uses of inhibitors according to the European patent applications EP 2343290 and EP 1336605 typically selectively relate to the species *Rattus*. Uses of compounds according to the international patent applications WO 97/24118, WO 02/100830, WO 2013/092756 and WO 03/084929 are also typically selective for the species of the rat.

A further example of compounds the use of which generally is at least largely selective for the species *Rattus* is a GPIIb/IIIa receptor antagonist. Thus, uses of inhibitors according to the international patent applications WO 95/14683 and WO 93/19046 typically relate selectively to the species *Rattus*. Also uses of compounds according to the U.S. Pat. No. 5,721,366 and the European patent EP 0656348 are typically selective for the species of the rat.

Typically, the compound suitable as a rodenticide is presented in a formulation which is suitable for oral administration. Herein, the active agent itself may have sufficient polarity characteristics in order to be taken orally, for example in an aqueous solution. In some embodiments a corresponding formulation may also include additives such as solubilizers which enable an oral intake of the active agent.

In some embodiments the compound active as a rodenticide is a low molecular weight thrombin inhibitor. Low molecular weight thrombin inhibitors inhibit thrombin, also in a form bonded to fibrin, typically, for example, by blocking the catalytic center of thrombin reversibly as substrate analogues. Usually these are substrate analogous tripeptides, derivatives thereof or peptidomimetics derived from benzamidine and arginine. Low molecular weight thrombin inhibitors are or have been used therapeutically in the prevention of thromboembolic disorders.

An illustrative example of a peptidomimetic is a compound according to the international patent applications WO 1994/029336 and/or WO 1997/23499. These can be, for example, a compound of the following formula, or a salt, hydrate or prodrug thereof tolerable for a rodent:

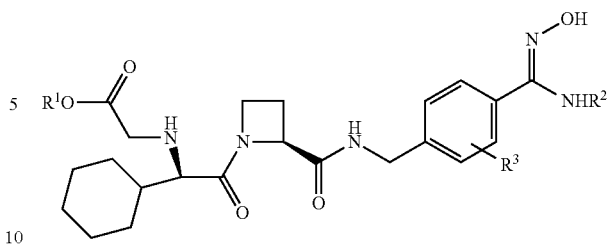

In this formula $R^1$ may be H, a $C_1$ to $C_4$ alkyl, a $C_1$ to $C_4$ alkylphenyl, $A^1C(O)N(R^4)R^5$, or $A^1C(O)OR^4$. Here, $A^1$ represents a $C_1$ to 05 alkylene, $R^4$ and $R^5$ are each independently H (hydrogen), a $C_1$ to $C_6$ alkyl, phenyl, 2-naphthyl or in the case of $R^1$ as $A^1C(O)N(R^4)R^5$ together with the nitrogen atom to which they are bonded pyrrolidinyl or piperidinyl. In some embodiments $R^1$ is an ethyl group. In some embodiments $R^1$ is a methyl group. In some embodiments $R^1$ is a propyl or an isopropyl group.

$R^2$ is H, OH, $OC(O)R^6$, $C(O)OR^7$ or $C(O)OCH(R^8)OC(O)R^9$, wherein $R^6$ may be a $C_1$ to $C_{17}$ alkyl, phenyl or 2-naphthyl, which may all optionally be substituted with a $C_1$ to $C_6$-alkyl or a halogen, $R^7$ is either (a) may be a $C_1$ to $C_3$ alkylphenyl, phenyl or 2-naphthyl, which may all optionally be substituted with a $C_1$ to $C_6$ alkyl, a $C_1$ to $C_6$ alkoxy, nitro or halogen, or (b) a $C_1$ to $C_2$ alkyl, which may optionally be substituted with a $C_1$ to $C_6$ alkoxy, a $C_1$ to $C_6$ acyloxy or a halogen. In some embodiments $R^2$ is H. $R^3$ is H or $C_1$ to $C_4$ alkyl.

An example of the above compound is melagatran that reversibly binds with high affinity to the active center of the thrombin. Melagatran includes a hydrogen atom as $R^1$. A prodrug form, ximelagatran (Exanta, Exarta, Exantan®) includes an ethyl group as $R^1$. It can be administered orally in humans and after resorption is rapidly converted into the active form melagatran. Since an administration for more than 35 days is accompanied with a risk of liver toxicity, the active agent is not authorized for use in humans.

Another illustrative example of a suitable peptidomimetic is a compound according to the international patent application WO 1998/37075. Such a compound may, for example, include a compound of the following formula or a salt, hydrate or prodrug thereof tolerable for a rodent:

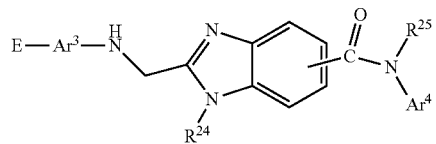

$R^{24}$ is $C_1$ to $C_6$ alkyl or $C_3$ to $C_7$ cycloalkyl. In some embodiments $R^{24}$ is ethyl. In some embodiments $R^{24}$ is methyl. $Ar^3$ is a phenylene or naphthylene group optionally substituted with a fluorine, chlorine or bromine atom, a trifluoromethyl, $C_{1-3}$ alkyl or $C_{1-3}$ alkoxy group or a thienylene, thiazolylene, pyridinylene, pyrimidinylene, pyrazinylene or pyridazinylene group optionally substituted in the carbon skeleton by a $C_{1-3}$ alkyl group. In some embodiments $Ar^3$ is a phenylene group. $Ar^4$ is a phenyl group optionally substituted with a fluorine atom or a 2-pyridinyl group. $R^{25}$ is (a) a $C_1$ to $C_3$ alkyl group which may be substituted with a carboxy, $C_1$ to $C_6$ alkoxycarbonyl, benzyloxycarbonyl, methylsulfonylaminocarbonyl or 1H-tetrazol-5-yl group or (b) a $C_{2-3}$ alkyl group substituted with a hydroxy, benzyloxy, carboxy-$C_{1-3}$-alkylamino, $C_{1-3}$-alkoxycarbonyl-$C_{1-3}$-alkylamino, N—($C_{1-3}$-alkyl)-carboxy-$C_{1-3}$-alkylamino or N—($C_{1-3}$-alkyl)-$C_{1-3}$-alkoxycarbonyl-$C_{1-3}$-alkylamino group, wherein in the above-mentioned groups the α carbon atom disposed adjacent to the nitrogen atom may not be substituted.

E represents a cyano or $R^{26}$NH—C(=NH) group, wherein $R^{26}$ is a hydrogen atom, a hydroxy group, a $C_1$ to $C_3$ alkyl group or an in vivo cleavable residue (see WO 1998/37075).

In some embodiments a compound according to WO 1998/37075 can be represented by the following formula or is a salt, hydrate or prodrug thereof tolerable for a rodent such as a rat:

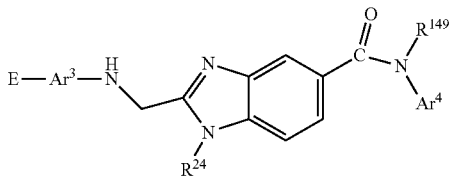

$R^{149}$ is a $C_1$ to $C_3$ alkyl group which may be substituted with a carboxy, $C_1$ to $C_6$ alkoxycarbonyl, benzyloxycarbonyl, methylsulfonylaminocarbonyl or 1H-tetrazol-5-yl group with the proviso that the α carbon atom disposed adjacent to the nitrogen atom may not be substituted.

A benzimidazole derivative with a benzamidine group according to WO 1998/37075 is dabigatran, a competitive, reversible and direct thrombin inhibitor. A prodrug, dabigatran etexilate (Pradaxa®) which is converted in vivo into dabigatran is described in detail in the international patent application WO 03/074056. Dabigatran is approved in the EU for the prevention of blood clot formation in the veins after elective surgical knee or hip replacement and for stroke prevention in patients with atrial fibrillation and risk of stroke. Its most common adverse drug effect (side effect) in humans is gastrointestinal bleedings.

Another example of a peptidomimetic is a compound according to the U.S. Pat. No. 4,101,653. Such a compound may, for example, be a compound of the following formula, or a salt, hydrate or prodrug thereof tolerable for a rodent:

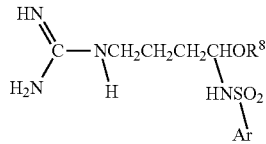

In this formula Ar may be, inter alia, phenyl, quinolinyl, tetrahydroquinolinyl, naphthyl, naphthoquinone or indane. $R^8$ may be a residue of the following formula or salt, hydrate or prodrug thereof tolerable for a rodent (see U.S. Pat. No. 4,101,653):

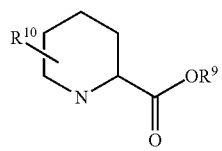

Here, $R^9$ may be, inter alia, H, a $C_1$ to $C_{10}$ alkyl, a $C_1$ to $C_{10}$ aryl, a $C_7$ to $C_{12}$ aralkyl or 5-indanyl. $R^{10}$ may be a $C_1$ to $C_5$ alkyl or alkoxy.

Another example of such a low molecular weight thrombin inhibitor is argatroban (Argatra®). Argatroban is an arginine derivative, which, however, has to be administered parenterally. However, it may be administered in a micelle-based formulation, which is also ingested orally. Such a formulation is described in the U.S. Pat. No. 5,679,690. A lipid emulsion of such a compound is also disclosed in the European patent application EP 0608828. A solid salt of argatroban which is obtained by precipitation and lyophilization and should be suitable for oral ingestion is disclosed in the US patent application US 2009/0221637. Argatroban, too, increases the propensity for bleedings so that here, too, bleedings are an adverse drug effect.

Another example of a low molecular weight thrombin inhibitor is a compound according to the international patent application WO 2014/028318. Such a compound may, for example, be a compound of the following formula or salt, hydrate or prodrug thereof tolerable for a rodent:

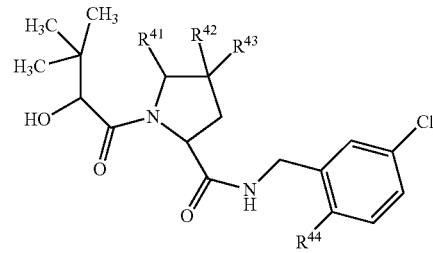

In this formula, m is 0 or 1. $R^{43}$ may be hydrogen, a halogen, OH, $C_1$ to $C_6$ alkyl or may form together with $R^{47}$ a $C_3$ to $C_8$ carbocycle. $R^{44}$ is a heterocycle, —($CR^{45}R^{46}$)$_2$NH or —($CR^{45}R^{46}$)$NH_2$, wherein $R^{45}$ and $R^{46}$ are each independently H, $C_1$ to $C_6$ akyl, —$CH_2F$, —$CHF_2$, $CF_3$ or —$CH_2OH$. $R^{47}$ may be H, a halogen, $CF_3$, $C_1$ to $C_6$ alkyl or may form together with $R^{43}$ a $C_3$ to $C_8$ carbocycle.

Another example of a low molecular weight thrombin inhibitor is a compound according to the international patent application WO 2014/058538. Such a compound may, for example, be a compound of the following formula or a salt, hydrate or prodrug thereof tolerable for a rodent:

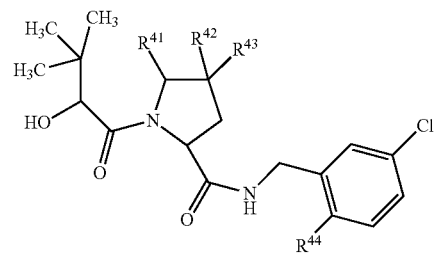

In this formula $R^{41}$ may be hydrogen or may form together with $R^{42}$ a $C_3$ to $C_8$ carbocycle. $R^{42}$ may be a halogen, $CF_3$, $C_1$ to $C_6$ akyl or may form together with $R^{43}$ a $C_3$ to $C_8$ carbocycle or together with $R^{41}$ a $C_3$ to $C_8$ carbocycle. $R^{43}$ may be hydrogen, halogen, OH, $C_1$ to $C_6$ akyl or may form together with $R^{42}$ a $C_3$ to $C_8$ carbocycle. $R^{44}$ is a heterocycle, —($CR^{45}R^{46}$)$_2$NH or —($CR^{45}R^{46}$)NH, wherein $R^{45}$ and $R^{46}$ are each independently H, $C_1$ to $C_6$ akyl, —$CH_2F$, —$CHF_2$, $CF_3$ or —$CH_2OH$.

In some embodiments the compound active as a rodenticide is a thrombin receptor antagonist. A thrombin receptor antagonist blocks protease activated receptors (PARs) which are mainly found on platelets and are in particular activated by thrombin. In this way the effect of thrombin on the blood platelets and thus the blood coagulation is inhibited. In some embodiments the thrombin receptor antagonist is an antagonist of the thrombin receptor PAR-1.

For example, an antagonist of the thrombin receptor PAR-1 may be a 2-iminopyrrolidin compound according to the European patent application EP 1813282. Such a compound may, for example, be a compound of the following formula or a salt, hydrate or prodrug thereof tolerable for a rodent:

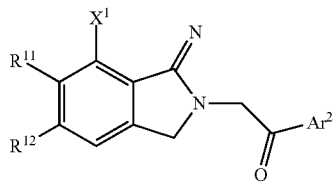

In this formula $Ar^2$ may, inter alia, be a phenyl group or a morpholino group, wherein a phenyl group may be substituted with a morpholino group, a piperazinyl group, a piperidinyl group or a pyrrolidinyl group. Herein, generally $Ar^2$ and/or a phenyl group included therein may be substituted as described in EP 1813282.

In the above formula $X^1$ may be H or a halogen. $R^{11}$ and $R^{12}$ each independently may be H, methoxy or ethoxy.

One example of a thrombin receptor antagonist according to EP 1813282 is atopaxar, also known as E5555. Atopaxar is a hydrobromide with the IUPAC name 1-(3-tert-butyl-4-methoxy-5-morpholin-4-yl-phenyl)-2-(5,6-diethoxy-4-fluoro-3-imino-1H-isoindol-2-yl)ethanone-hydrobromide. In two phase II studies an increase in liver enzymes was observed. Bleedings observed in one study have been denoted as not statistically significant.

An antagonist of the thrombin receptor PAR-1 may further be a derivative of the himbacine alkaloid from the bark of the Australian *magnolia*, such as a compound according to the US patent application US 2003/216437 or the international patent application WO 03/089428. Such a compound may, for example, be a compound of the following formula or a salt, hydrate or prodrug thereof tolerable for a rodent:

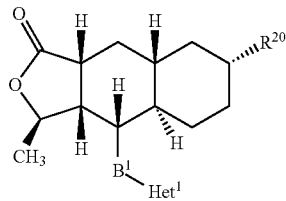

In this formula $Het^1$ is a mono or bicyclic heteroaromatic group of 5 to 10 atoms which includes 1 to 9 carbon atoms and 1, 2, 3 or 4 of the heteroatoms N, O or S. $Het^1$ may have one or two substituents selected from the series of halogen, —OH, aryl, ($C_1$ to $C_6$) alkyl, ($C_1$ to $C_6$) alkoxy, ($C_3$ to $C_6$) cycloalkyl, amino, and aminoalkyl. In some embodiments $Het^1$ is substituted with a phenyl or a benzyl group. In some embodiments $Het^1$ is substituted with a heteroaryl group. In some embodiments $Het^1$ is substituted with an aryl or a heteroaryl group that carries no substituent. In some embodiments $Het^1$ is substituted with an aryl or a heteroaryl group which carries a $CF_3$ group or a CN group as a substituent. A corresponding aryl group is in some embodiments a phenyl group. In some embodiments $Het^1$ is substituted with an aryl or a heteroaryl group carrying a fluorine atom as a substituent. In some embodiments $Het^1$ comprises a pyridyl group which is bonded to the group $B^1$.

$B^1$ is $(CH_2)_{n1}$, cis- or trans-$(CH_2)_{n2}CR^{14}$=$CR^{15}(CH_2)_{n3}$ or $(CH_2)_{n2}C$≡$C(CH_2)_{n3}$, wherein $n_1$ is 0 to 5 and $n_2$ and $n_3$ are each independently 0 to 2. In some embodiments $n_2$ and $n_3$ are each independently 0 or 1. $R^{14}$ and $R^{15}$ are each independently H, $C_1$ to $C_6$ alkyl or a halogen. In some embodiments $B^1$ is trans-CH=CH or C≡C.

$R^{20}$ is H, $C_1$ to $C_6$ alkyl, $C_3$ to $C_8$ cycloalkyl, —NHC(O)$OR^{21}$, —NHC(O)$R^{21}$ or another group specified in US 2003/216437. Here, $R^{21}$ may be a group such as H, $C_1$ to $C_6$ alkyl, $C_1$ to $C_6$-alkyl-OH, $C_1$ to $C_6$ alkyl, alkoxy or a further group specified in US 2003/216437.

One example of a thrombin receptor antagonist according to US 2003/216437 is vorapaxar (Zontivity®), also known as SCH 530348. This is N-[(3R,3aS,4S,4aR,7R,8aR,9aR)-4-[(E)-2-[5-(3-fluorophenyl)-2-pyridyl]vinyl]-3-methyl-1-oxo-3a,4,4a,5,6,7,8,8a,9,9a-decahydro-3H-benzo[f]isobenzofuran-7-yl]carbamate. This compound is approved in the USA for the use to reduce the risk of heart attack, stroke and cardiovascular death. In patients who previously had a stroke, a transient ischemic attack (abbreviated TIA) or bleedings in the head, vorapaxar must not be used due to the high risk of bleedings in the head. In general, an adverse effect of the use of vorapaxar in humans are intracranial bleedings.

An antagonist of the thrombin receptor PAR-1 may also be a compound according to the international patent application WO 01/96330. Such a compound may, for example, be a compound of the following formula or a salt, hydrate or prodrug thereof tolerable for a rodent:

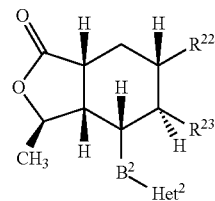

In this formula $Het^2$ is a mono, bi or tricyclic heteroaromatic group of 5 to 14 atoms, which includes 1 to 13 carbon atoms and 1 to 4 heteroatoms. $B^2$ is $(CH_2)_{n1}$—$CH_2$—O—, —$CH_2$—S—, —$CH_2NR^{13}$—, —C(O)$NR^{13}$—, —$NR^{13}$C(O),

cis- or trans$(CH_2)_{n2}CR^{14}$=$CR^{15}(CH_2)_{n3}$ or $(CH_2)_{n2}C$≡C$(CH_2)_{n3}$, wherein $n_1$ to $n_3$ are as defined above. $R^{13}$ is H, $C_1$ to $C_6$ alkyl, phenyl, $C_3$ to $C_7$ cycloalkyl, ($C_{3-7}$ cycloalkyl)-($C_{1-6}$ alkyl), ($C_{1-6}$ alkoxy)-($C_{1-6}$ alkyl), hydroxy-($C_{1-6}$ alkyl)

and amino-$(C_{1-6}$ alkyl). $R^{14}$ and $R^{15}$ are each independently H, $C_1$ to $C_6$ alkyl or a halogen.

$R^{22}$ and $R^{23}$ in this formula are each independently, among others, H, $R^{16}(C_1$ to $C_{10}$ alkyl), $R^{16}(C_2$ to $C_{10}$ alkenyl), $R^{16}(C_2$ to $C_{10}$ alkynyl), $R^{16}$ $(C_1$ to $C_{10}$ alkyl), heterocycloalkyl, $R^{17}$ aryl, $(R^{17}$ aryl)-$(C_1$ to $C_8$ alkyl), —OH, —OC(O)—$R^{18}$, —CO(O)$R^{19}$, —C(O)—$R^8$, —C(O) N—$R^{18}R^{19}$, —N—$R^{18}R^{19}$ or a further group specified in WO 01/96330. Here, $R^{16}$ and $R^{17}$ are each independently H, a halogen, —OH or another group specified in WO 01/96330 and $R^{18}$ and $R^{19}$ are each independently H, $C_1$ to $C_{10}$ alkyl or another group specified in WO 01/96330.

As another example an antagonist of the thrombin receptor PAR-1 may also be a compound according to the European patent application EP 1867331. Such a compound may, for example, be a compound of the following formula or a salt, hydrate or prodrug thereof tolerable for a rodent:

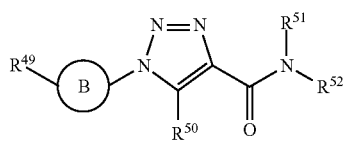

In this formula B is a monocyclic aromatic ring which may optionally include further substituents. $R^{49}$ is one of the groups —NHCOR$^{53}$, —NHSO$_2$R$^{54}$, —NHCON(R$^{55}$)(R$^{56}$), —NHCOOR$^{57}$ or —CONHR$^{58}$. Here, $R^{53}$ to $R^{58}$ are each independently H, an optionally substituted hydrocarbon group, an optionally substituted heterocyclic group or an optionally substituted alkoxy group. Likewise, $R^{50}$, $R^{51}$ and $R^{52}$ are each H, an optionally substituted hydrocarbon group, an optionally substituted heterocyclic group or an optionally substituted alkoxy group.

In some embodiments the compound active as a rodenticide is an inhibitor of factor Xa. In some embodiments the inhibitor of factor Xa is an oxazolidinone compound according to the international patent application WO 01/47919. Such a compound may, for example, be an oxazolidone of the following formula or a salt, hydrate and/or prodrug thereof tolerable for a rodent.

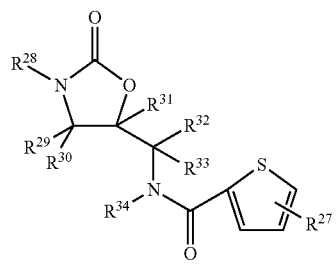

In this formula $R^{27}$ is a halogen, cyano, nitro, amino, aminomethyl, $C_1$ to $C_8$ alkyl (which in turn may optionally mono- or polysubstituted by halogen), $C_3$ to $C_7$ cycloalkyl, $C_1$ to $C_8$ alkoxy, imidazolinyl, —C(=NH)NH$_2$, carbamoyl or mono- and di-$(C_1$ to $C_4$)alkyl-aminocarbonyl. In some embodiments $R^{27}$ is disposed at position 4 of the thiophene ring. In some embodiments $R^{27}$ is disposed at position 5 of the thiophene ring. In some embodiments $R^{27}$ is a chlorine atom. $R^{29}$, $R^{30}$, $R^{31}$, $R^{32}$, $R^{33}$ and $R^{34}$ are identical or different and represent hydrogen or $C_1$ to $C_6$ alkyl. In some embodiments, $R^{31}$, $R^{32}$ and $R^{33}$ are hydrogen. In some embodiments, $R^{29}$ and $R^{30}$ are hydrogen. In some embodiments, $R^{29}$, $R^{30}$, $R^{31}$, $R^{32}$ and $R^{33}$ are hydrogen. $R^{28}$ represents one of the following groups: A'-, A'-M', D'-M'-A'-, B'-M'-A'-, B'—, B'-M'-, B'-M'-B'— and D'-M'-B'—. Here the residue A' denotes $(C_6$ to $C_{14})$ aryl, the residue B' denotes a 5- or 6-membered aromatic heterocycle which includes 1, 2 or 3 heteroatoms from the series S, N, NO (N-oxide) and O. The residue D' denotes a saturated or partially unsaturated mono- or bicyclic 4- to 9-membered heterocyclic ring which includes 1, 2 or 3 heteroatoms from the series S, SO, SO$_2$, N, NO (N-oxide) and O and the residue M' denotes NH—, —CH$_2$—, —CH$_2$CH$_2$—, —O—, —NH—CH$_2$—, —CH$_2$—NH—, —OCH$_2$—, —CH$_2$O—, —CONH—, —NHCO—, —COO—, —OOC—, —S—, —SO$_2$— or a covalent bond.

In some embodiments, an oxazolidone according to WO 01/47919 has the following formula or is a salt, hydrate or prodrug thereof tolerable for a chosen rodent such as a rat:

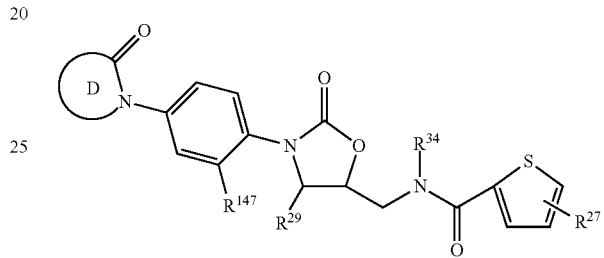

The ring D is a saturated 5- or 6-membered heterocycle which is bonded to the phenylene ring via a nitrogen atom. The ring D includes a carbonyl group directly adjacent to the linked nitrogen atom and may comprise a heteroatom from the series S, N and O. $R^{147}$ is hydrogen, fluorine, chlorine, nitro, amino, trifluoromethyl, methyl or cyano. $R^{27}$, $R^{29}$ and $R^{30}$ are as defined in the foregoing.

An example of a direct inhibitor of factor Xa according to WO 01/47919 is rivaroxaban (Xarelto®). Rivaroxaban is an orally active anticoagulant. Like for other compounds mentioned herein adverse drug effects of rivaroxaban when applied to humans are acute clinically significant bleedings.

Another example of an inhibitor of factor Xa is an oxazolidinone compound according to the US patent application US 2003/191115 or the international patent application WO 03/026652. Such a compound may, for example, be a compound of the following formula or a salt, hydrate or prodrug thereof tolerable for a rodent:

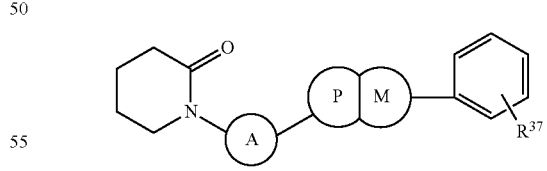

In this formula cycle A is either a $C_3$ to $C_{10}$ carbocycle which is substituted with 0 to 2 groups $R^{33a}$ or a 5- to 12-membered heterocycle consisting of carbon atoms and 1, 2, 3 or 4 heteroatoms and substituted with 0 to 2 groups $R^{33a}$. The respective heteroatoms of the 5- to 12-membered heterocycle include N, O or S. In some embodiments cycle A is a phenylene ring.

In the fused rings P and M P is a 5-, 6-, or 7-membered carbocycle or a 5-, 6-, or 7-membered heterocycle consisting of carbon atoms and 1, 2 or 3 heteroatoms. The heteroatoms of the 5-, 6-, or 7-membered heterocycle are N, O or S. Ring P is substituted with 0 to 3 groups $R^{34a}$ and 0 to 2 carbonyl groups and includes 0 to 3 double bonds in the cycle.

$R^{33a}$ may, for example, be H, OH, F, Cl, Br, I, $C_1$ to $C_4$ alkyl, $C_1$ to $C_4$ alkoxy, $CF_3$, $CF_2CF_3$, —ON, nitro, amino or amido (see also US 2003/191115). $R^{34a}$ may, for example, be H, —$(CH_2)_r$—$R^{35}$, —$(CH(CH_3))_r$—$R^{35}$, —$(C(CH_3)_2)_r$—$R^{35}$, alkoxy, thioalkyl or amino, wherein $R^{34a}$ does not form a N-halo, N—S— or N—CN— bond, and r is one of the numbers 0, 1, 2, 3, 4, 5 and 6. $R^{35}$ may, inter alia, be H, $CH_3$, $CH_2CH_3$, $CH_2CH_2CH_3$, $CH(CH_3)_2$, F, Cl, Br, I, —CN, —CHO, $CF_3$, amino, amido, carboxy, sulfoxy or carbonyl. $R^{36}$ may, inter alia, be H, $CH(CH_2OH)_2$, $CH(CH_2OCH_3)_2$, $CH(CH_2OCH_2CH_3)_2$, $CH(CH_2OCH_2CH_2CH_3)_2$, $CH(CH_2OCH_2CH_2CH_3)_2$, carbonyl, amido, sulfoxy or sulfamido (see also US 2003/19115).

M is a 3- to 10-membered carbocycle or a 4- to 10-membered heterocycle which consists of carbon atoms and 1, 2 or 3 heteroatoms. The heteroatoms of the 4- to 10-membered heterocycle are N, O or S. Ring M is substituted with 0 to 3 groups $R^{34}$ and 0 to 2 carbonyl groups and includes 0 to 3 double bonds in the cycle.

In the above formula $R^{37}$ may, inter alia, be H, —OH, F, Cl, Br, I, CN, $C_1$ to $C_4$ alkyl, $OCH_3$, $OCH_2CH_3$, $OCH_2CH_2CH_3$, $O(CH_3)_2$, $OCF_3$ or amino. In some embodiments the phenyl residue comprising the substituent $R^{37}$ has the structure

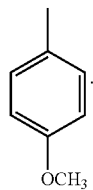

In some embodiments the phenyl residue comprising the substituent $R^{37}$ has one of the structures

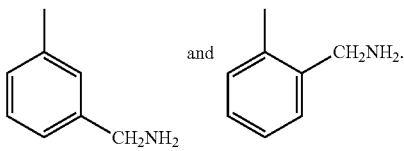

In some embodiments the phenyl residue comprising the substituent $R^{37}$ has the structure

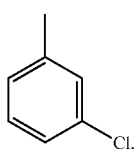

In some embodiments the phenyl residue comprising the substituent $R^{37}$ has one of the structures

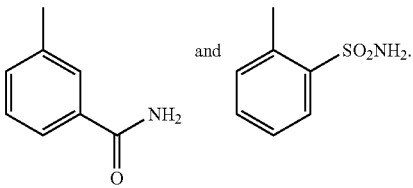

An example of a direct inhibitor of factor Xa according to US 2003/191115 and WO 03/026652 is apixaban (Eliquis®) which is also orally active. It is approved in the EU for prophylaxis of venous thromboembolism after elective orthopedic surgery and for the prevention of ischemic strokes and systemic embolism in adult patients with non-valvular atrial fibrillation. Besides, it is approved in the EU for the therapy and recurrance prevention of pulmonary embolism and deep vein thrombosis. Here, too, adverse drug effects in humans is the risk of serious bleedings.

Another example of an inhibitor of factor Xa is a compound according to the European patent application EP 2343290. Such a compound may, for example, be a compound of the following formula or a salt, hydrate or prodrug thereof tolerable for a rodent:

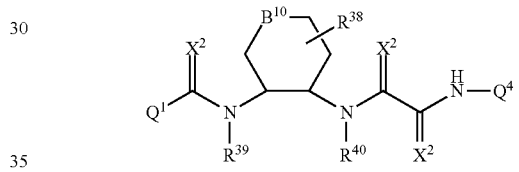

In this formula $Q^1$ is a saturated or unsaturated 5- or 6-membered hydrocarbon ring, a saturated or unsaturated 5- to 7-membered heterocyclic group, a saturated or unsaturated bicyclic or tricyclic fused hydrocarbon group or a saturated or unsaturated bicyclic or tricyclic fused heterocyclic group. In some embodiments $Q^1$ is a 5-methyl-6,7-dihydro-4H-[1,3]thiazolo[5,4-c]pyridine residue. $X^2$ is an oxygen or sulfur atom. $B^{10}$ may be N or $CH_2$. $R^{38}$ may, inter alia, be H, OH, alkoxy, alkyl, alkenyl, alkynyl, halogen, CN, amino, aminoalkyl, acyl, acylamino including acylaminoalkyl, carbamoyl, aryl or aralkyl (see EP 2343290). $R^{39}$ and $R^{40}$ are each independently H, OH, an alkyl group or an alkoxy group. $Q^4$ is an aryl group, an arylalkenyl group, an arylalkynyl group, a heteroaryl group, a heteroarylalkenyl group, a saturated or unsaturated bicyclic or tricyclic fused hydrocarbon group or a saturated or unsaturated bicyclic or tricyclic fused heterocyclic group which may be substituted.

In some embodiments a compound according to EP 2343290 has the following formula or is a salt, hydrate or prodrug thereof tolerable for a rodent:

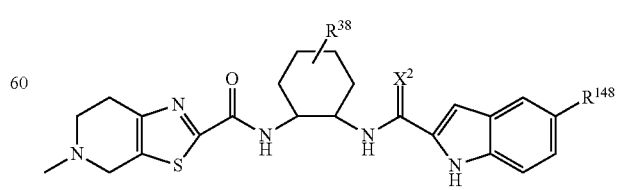

in this formula $R^{148}$ is chlorine or bromine. $X^2$ and $R^{38}$ are as indicated above.

In some embodiments a compound according to EP 2343290 has the following formula or is a salt, hydrate or prodrug thereof tolerable for a rodent:

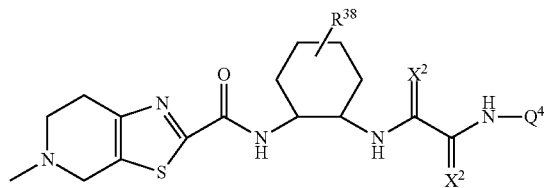

Here again, $X^2$ and $R^{38}$ are as indicated above.

In the above structural formulas a cyclohexane ring substituted with the residue $R^{38}$ may, for example, have the structure

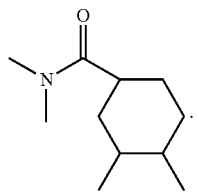

In some embodiments the combination of $R^{38}$ and the cyclohexane ring may have the structure

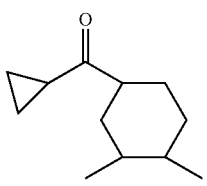

or the structure

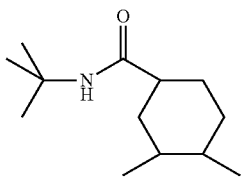

In some embodiments such a group comprising a cyclohexane ring may have the structure

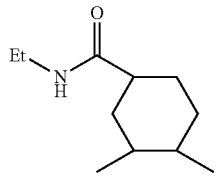

or the structure

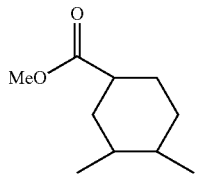

In embodiments where a piperidine ring substituted with the residue $R^{38}$ and no cyclohexane ring is present, the piperidine ring substituted with the residue $R^{38}$ may have the structure

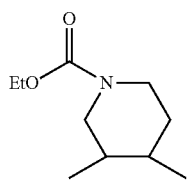

or the structure

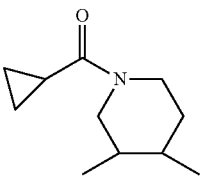

An example of a factor Xa inhibitor according to EP 2343290 which may be administered orally is edoxaban (Lixiana®, Savaysa®). In the European patent application EP 2374456 edoxaban is explained in more detail. Bleedings such as nose bleeding or severe non-menstrual vaginal bleeding are known adverse drug effects.

A compound according to the international patent applications WO 01/64642 and WO 01/64643 is also an example of an inhibitor of factor Xa. Such a compound may, for example, be a compound of the following formula or a salt, hydrate or prodrug tolerable for a rodent:

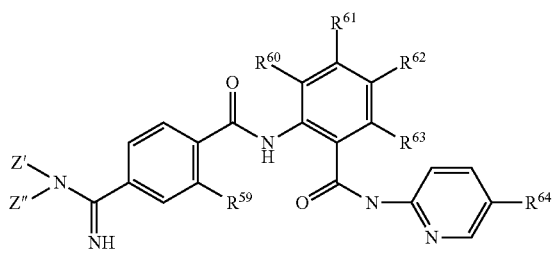

In this formula, Z' and Z" are each independently $C_1$ to $C_6$ alkyl such as $C_1$ to $C_3$ alkyl. $R^{59}$ is H, F, Cl or Br. $R^{61}$ and $R^{63}$ are, for example, H. $R^{60}$ and $R^{62}$ are each independently H, F, Cl, Br, OH or OMe. $R^{64}$ is F, Cl, Br, Me, OH or OMe.

An example of a factor Xa inhibitor according to WO 01/64642 and WO 01/64643 which can be administered orally is betrixaban (N-(5-chloropyridin-2-yl)-2-([4-(N,N- dimethylcarbamimidoyl)-benzoyl]amino)-5-methoxybenzamide). For betrixaban as a drug bleedings were observed as an adverse reaction in humans, too.

Another example of an inhibitor of factor Xa is a compound according to the European patent application EP 1336605. Such a compound may, for example, be a compound of the following formula or salt, hydrate or prodrug thereof tolerable for a rodent:

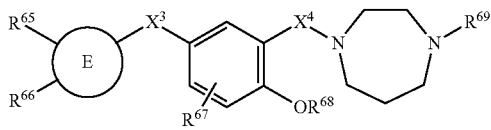

In this formula ring E is a benzene ring or a 5- or 6-membered heterocycle having comprising 1, 2 or 3 heteroatoms which may be N, S or O. $X^3$ and $X^4$ are each independently —C(=O)—NH—, C(=O)—N($C_{1-6}$ alkyl), —NH—C(=O)—, —N($C_{1-6}$ alkyl)-C(=O)—, —$CH_2$—NH—, —$CH_2$—N($C_{1-6}$ alkyl)-, —NH—$CH_2$—, or —N—($C_{1-6}$ alkyl)-$CH_2$—. $R^{65}$ is a group of a halogen, $C_1$ to $C_6$ alkyl or $C_1$ to $C_6$ alkoxy. $R^{66}$ and $R^{67}$ are each independently H, a halogen, CN, NH—$SO_2$—($C_{1-6}$ alkyl), —NH—CO—($C_{1-6}$ alkyl), —CO—($C_{1-6}$ alkyl), —CO—($C_{1-6}$ alkoxy), —C(O)$NH_2$, $C_1$ to $C_6$ alkyl or $C_1$ to $C_6$ alkoxy or S—($C_{1-6}$ alkyl). $R^{68}$ is H, $SO_3H$ or a sugar residue. $R^{69}$ is H, $C_1$ to $C_6$ alkyl, —$SO_2$—($C_1$ to $C_6$ alkyl) or a 5- or 6-membered heterocycle comprising 1, 2 or 3 heteroatoms which may be N, S or O.

Darexaban (N-(3-hydroxy-2-{[4-(4-methyl-1,4-diazepan-1-yl)-benzoyl]amino}phenyl)-4-methoxybenzamide) is an example of an inhibitor of factor Xa according to EP 1336605 whose development as a drug was not pursued because of bleedings as an adverse effect.

An example of an inhibitor of factor Xa is also a compound according to the international patent application WO 97/24118. Such a compound may, for example, be a compound of the following formula or a salt, hydrate or prodrug thereof tolerable for a rodent:

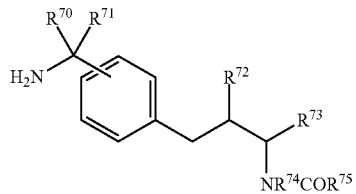

In this formula $R^{70}$ and $R^{71}$ are each independently H or =$NR^{82}$. Here, $R^{82}$ is one of the groups $R^{82a}O_2C$—, $R^{82a}O$—, HO—, amino, CN, $R^{82a}CO$—, HCO—, $C_1$ to $C_6$ alkyl, $NO_2$, aralkyl or heteroaralkyl with $R^{82a}$ as alkyl, aralkyl or heteroalkyl. $R^{72}$ is $CO_2H$, $CO_2(C_{1-6}$ alkyl), CHO, —$CH_2OH$, —$CH_2SH$, —C(O)($C_{1-6}$ alkyl), —$CONH_2$, —CON($C_{1-6}$ alkyl)$_2$, —$CH_2O(C_{1-6}$ alkyl), —$CH_2O$-aryl-$CH_2S(C_{1-6}$ alkyl) or $CH_2S$-aryl. $R^{73}$ is H, alkyl, cycloalkyl or $CH_2$-aryl including $CH_2$-heteroaryl. $R^{74}$ is H or $C_1$ to $C_6$ alkyl. $R^{75}$ is alkyl, alkenyl or aryl including heteroaryl, wherein the corresponding aryl group itself may be bonded to another aryl group including a heteroaryl group.

Otamixaban (methyl(2R,3R)-2-{3-[amino(imino)methyl]benzyl}-3-{[4-(1-oxidopyridin-4-yl)benzoyl]amino}butanoate) is an example of an inhibitor of factor Xa according to WO 97/24118 whose development was not pursued as a drug.

Another example of an inhibitor of factor Xa is a compound according to the international patent application WO 02/100830. Such a compound may be a compound of the following formula or a salt, hydrate or prodrug thereof tolerable for a rodent:

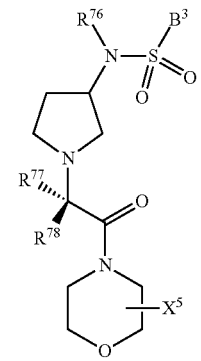

In this formula $X^5$ represents, inter alia, for one or more substituents of (i) $CF_3$, F, COOH, $C_1$ to $C_6$ alkyl, —$CONH_2$, $CONH(C_{1-3}$ alkyl), CON ($C_{1-3}$ alkyl)$_2$, C(O)-phenyl, a 5- to 6-membered cycloalkyl residue, a 5- to 6-membered heterocycle which comprises at least one heteroatom of O, N or S, or (ii) a second ring of phenyl, a 5- to 6-membered cycloalkyl residue or a 5- to 6-membered aromatic heterocycle which comprises at least one heteroatom of O, N or S, wherein the second ring is fused to the heterocyclic ring of the above formula (see also WO 02/100830).

$B^3$ is one of the following groups:

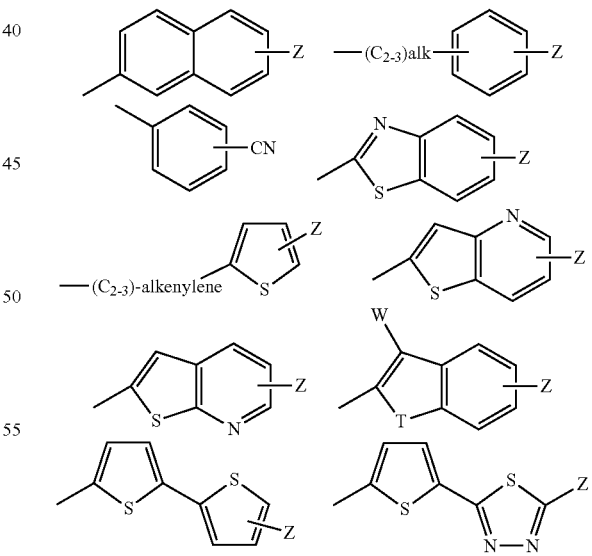

Here, alk is $C_2$ to $C_3$ alkylene or $C_2$ to $C_3$ alkenylene, T is S, O or N, W is $C_1$ to $C_3$ alkyl and Z is H, OH or a halogen. $R^{76}$ in the above formula may, inter alia, be H, $C_1$ to $C_6$ alkyl, $C_3$ to $C_6$ alkenyl, phenyl or a 5- to 6-membered aromatic heterocyclic group. $R^{77}$ and $R^{78}$ are each independently H, $C_1$ to $C_3$ alkyl or $CF_3$.

Another example of an inhibitor of factor Xa is a compound according to the international patent application WO 2013/092756. Such a compound may be a compound of the following formula or a salt, hydrate or prodrug thereof tolerable for a rodent:

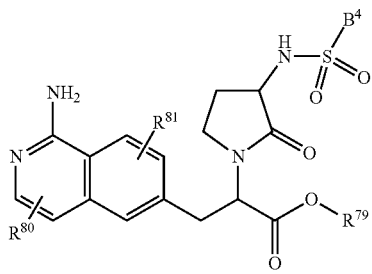

In this formula $B^4$ is one of the both following groups:

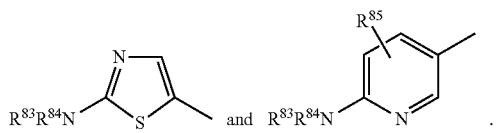

Herein, $R^{83}$ and $R^{84}$ are each independently a $C_1$ to $C_6$ alkyl or a $C_3$ to $C_7$ cycloalkyl group or form together with the N atom to which they are bonded a 3- to 7-membered heterocycloalkyl group which includes 1 or 2 heteroatoms of N, O or S. $R^{85}$ is H, a halogen, CN, $C_1$ to $C_6$ alkyl or $C_1$ to $C_6$ alkoxy.

$R^{79}$ in the above formula is, inter alia, H, a $C_1$ to $C_6$ alkyl group or a $C_3$ to $C_7$ cycloalkyl group (see WO 2013/092756). $R^{80}$ is H or a $C_1$ to $C_6$ alkyl group. $R^{81}$ is OH, a halogen, CN, a $C_1$ to $C_6$ alkyl group or a $C_1$ to $C_6$ alkoxy group.

An example of an inhibitor of factor Xa is moreover a compound according to the international patent application WO 03/084929. Such a compound is a compound of the following formula or a salt, hydrate or prodrug thereof tolerable for a rodent:

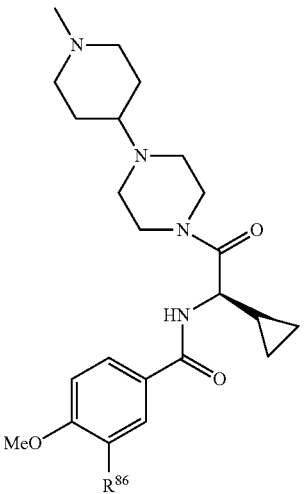

In this formula $R^{86}$ is hydrogen or fluorine.

In a method disclosed herein and/or in a use disclosed herein, moreover, a compound may be used which acts fibrinolytic and thus promotes or causes the cleavage of fibrin. Such a compound thus leads to the dissolution of a blood clot. Fibrinolysis is classified as a separate process in addition to blood coagulation; its onset is slower and it acts regulatory on the blood coagulation. By means of a compound that causes hyperfibrinolysis, thus, bleedings can be caused likewise.

An active agent suitable in a method and/or a use according to the present disclosure may also be an inhibitor of plasminogen activator inhibitor (PAI), for example, the plasminogen activator inhibitor type 1 (PAI-1). Plasminogen activator inhibitor 1 inhibits the tissue-specific plasminogen activator (t-PA) and urokinase. Both enzymes, t-PA and urokinase, convert the inactive plasminogen into plasmin, which in turn degrades fibrin polymers. PAI-1 thus contributes to a rapid hemostasis by forming a thrombus by blocking plasmin activation. By means of a suitable inhibitor this effect of PAI-1 can be inhibited.

An illustrative example of an inhibitor of PAI-1 is a compound according to the European patent application EP 2607348. Such a compound may be a compound of the following formula or a salt, hydrate or prodrug thereof tolerable for a rodent:

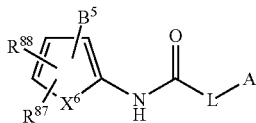

In this formula $R^{87}$ and $R^{88}$ are each independently H, a halogen, a $C_1$ to $C_6$ alkyl group, a $C_3$ to $C_6$ cycloalkyl group, a $C_3$ to $C_8$ cycloalkenyl group, a $C_2$ to $C_6$ alkynyl group or a heteroaryl. $X^6$ is S or —CH=CH—. $B^5$ is COOH, a group of alkoxycarbonyl, aryloxycarbonyl and aralkyloxycarbonyl which can be converted in vivo into COOH (see EP 2607348).

L is a single bond, $C_1$ to $C_6$ alkylene, $C_1$- to $C_6$-alkylene-O, $C_1$- to $C_6$-alkylene-NH, $C_1$ to $C_6$-alkylene-NHCO, $C_2$ to $C_6$ alkenylene, C(O), NH or C(O)NH. A is one of the following groups: benzyl substituted with one or two $C_1$ to $C_6$ alkyl groups or $CF_3$, optionally substituted (see EP 2607348)-1-indolyl, 2-indolyl or 3-indolyl, optionally substituted-2-thiophenyl, 2-furanyl or optionally substituted 1-cyclohexenyl.

Another example of an inhibitor of PAI-1 is a compound according to the British patent application GB 2372986. Such a compound may be a compound of the following formula or a salt, hydrate or prodrug thereof tolerable for a rodent:

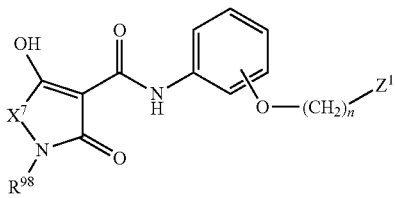

In this formula n is an integer of 1, 2, 3, 4, 5 or 6 to 10. In some embodiments, n is 1. $R^{98}$ is one of the residues H, $C_1$ to $C_6$ alkyl or $(CH_2)_{n'}$·Ar, wherein n' is an integer of 1, 2, 3, 4 or 5 to 10. $X^7$ is $CHR^{90}$ or $—C(R^{91})=C(R^{92})—$, wherein $R^{90}$ is H, $C_1$ to $C_6$ alkyl, an unsaturated carbocyclic group or an unsaturated heterocyclic group. $R^{91}$ and $R^{92}$ together with the carbon atoms to which they are bonded form an optionally substituted benzene ring. $Z^1$ is tetrazole or $COOR^{93}$, wherein $R^{93}$ is either H or $C_1$ to $C_6$ alkyl.

An active agent suitable in the frame of the present disclosure may also be a platelet function inhibiting agent, i.e. a thrombocyte aggregation inhibitor. An thrombocyte aggregation inhibitor may be an antagonist of the adenosine diphosphate receptor P2Y12 on the platelets. By binding of such an antagonist the binding of ADP to this receptor is blocked, resulting in an inhibition of platelet aggregation.

An example of an antagonist of the ADP receptor P2Y12 is a thienopyridin compound according to the U.S. Pat. Nos. 4,051,141 and 4,591,592. Such a compound may be a compound of the following formula or a salt, hydrate or prodrug thereof tolerable for a rodent:

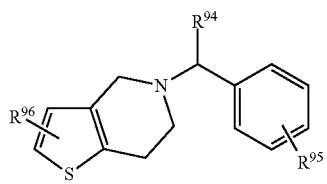

In this formula $R^{94}$ is H, a halogen, hydroxy or $C_1$ to $C_6$ alkyl. $R^{95}$ is H, a halogen, hydroxy, nitro, $C_1$ to $C_6$ alkyl or $C_1$ to $C_6$ alkoxy. $R^{96}$ is H or a halogen.

Corresponding compounds are non-competitive irreversible antagonists of the ADP receptor P2Y12 on platelets. An example for an orally administrable thienopyridin compound according to U.S. Pat. Nos. 4,051,141 and 4,591,592 is ticlopidine (Tiklyd®). Ticlopidine is a prodrug that is converted in vivo into an active metabolite.

Another example of an antagonist of the ADP receptor P2Y12 is a compound according to the European patent EP 0099802 or U.S. Pat. No. 4,529,596. Such a compound may be a compound of the following formula or a salt, hydrate or prodrug thereof tolerable for a rodent:

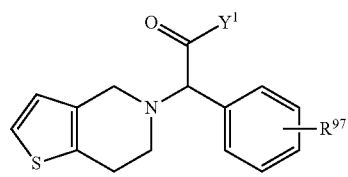

In this formula $Y^1$ is a group of $—OR^{98}$ or $—N(R^{99})R^{100}$. $R^{98}$ is H or $C_1$ to $C_4$ alkyl. $R^{99}$ and $R^{100}$ and $R^{97}$ in the above formula are independently H, a halogen or a $C_1$ to $C_4$ alkyl group.

Clopidogrel (Iscovera, Plavix®) is an orally administrable thrombocyte aggregation inhibitor according to EP 0099802 and U.S. Pat. No. 4,529,596. U.S. Pat. No. 4,847,265 describes clopidogrel. Clopidogrel, too, is a prodrug that is only converted in vivo into an active metabolite which acts as a non-competitive irreversible antagonist of the ADP receptor P2Y12. In humans, the maximum of the aggregation inhibition after oral administration of ticlopidine or clopidogrel is achieved after 4 to 6 days. Adverse drug effects include bleedings such as nosebleed, stomach or intestinal bleeding, hematoma or blood in urine.

Another example of an antagonist of the ADP receptor P2Y12 is a compound according to the European patent EP 0099802 or U.S. Pat. No. 5,288,726. Such a compound may be a compound of the following formula or a salt, hydrate or prodrug thereof tolerable for a rodent:

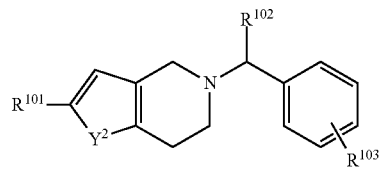

In this formula $R^{101}$ is, inter alia, H, hydroxy, amino, $C_{1-4}$-alkoxy, $Ar—C_{1-4}$-alkyloxy, $C_1$ to $C_{18}$ alkanoyloxy, $C_3$ to $C_6$ alkenoyloxy or arylcarbonyloxy (see U.S. Pat. No. 4,529,596). $R^{102}$ is $C_1$ to $C_{10}$ alkanoyl, $C_3$ to $C_6$ alkenoyl, $C_4$ to $C_8$ cycloalkylcarbonyl (including 3 to 7 ring atoms), substituted benzoyl or 5,6-dihydro-1,4,2-dioxazine-3-yl. $Y^2$ is N, O or S. $R^{103}$ is, inter alia, H, a halogen, hydroxy, amino, $C_1$ to $C_4$ alkyl, $C_1$ to $C_4$ alkoxy, $C_1$ to $C_4$ alkylthio or a carboxy group (see U.S. Pat. No. 4,529,596).

An illustrative example of a compound according to EP 0 099 802 or U.S. Pat. No. 5,288,726 is prasugrel ((RS)-[5-[2-cyclopropyl-1-(2-fluorophenyl)-2-oxoethyl]-6,7-dihydro-4H-thieno[3,2-c]pyridin-2-yl]acetate). The European patent EP 1298132 and U.S. Pat. No. 6,693,115 describe prasugrel. Similar to ticlopidine and clopidogrel prasugrel is a prodrug that is converted in vivo into a thiol containing active metabolite. Prasugrel, too, is a non-competitive irreversible antagonist of the ADP receptor P2Y12 on platelets. Here, too, bleedings are known as an adverse effect in humans. As risk groups for bleedings during the treatment with prasugrel and clopidogrel among others patients of >75 years and patients with a body weight <60 kg have been identified.

Moreover, a compound according to the international patent application WO 2008/054796 is an example of an antagonist of the ADP receptor P2Y12. Such a compound may be a compound of the following formula or a salt, hydrate or prodrug thereof tolerable for a rodent:

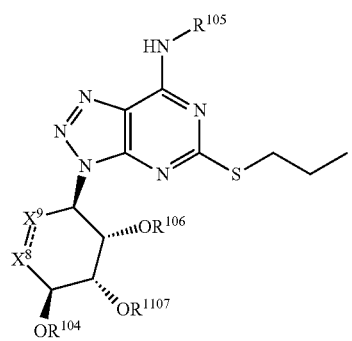

In this formula $R^{104}$ is H, a halogen, hydroxy-$C_1$- to $C_8$-alkyl, $C_1$- to $C_8$-alkoxy-$C_1$- to $C_8$-alkyl or carboxy-$C_1$- to $C_8$-alkyl. $R^{105}$ is $C_1$ to $C_8$ alkyl, $C_{1-8}$-alkoxy-$C_{1-8}$-alkylthio-$C_{1-8}$-alkyl, $C_3$- to $C_8$-cycloalkyl-$C_{1-8}$-alkyl, phenyl-$C_{1-8}$-alkyl, heterocyclyl, heterocyclyl-$C_{1-8}$-alkyl, heteroaryl-$C_{1-8}$-alkyl or halo-$C_{1-8}$-alkyl. $R^{106}$ and $R^{107}$ are each independently H or form together with the carbon atoms to which they are bonded a 5- or 6-membered heterocycle. $X^8$ and $X^9$ are each independently CH, $CH_2$ or CH(OH). ---- indicates that the corresponding bond in some embodiments may be a single bond and in some embodiments may be double bond.

Another example of an antagonist of the ADP receptor P2Y12 is a compound according to the international patent application WO 2008/054795. Such a compound may be a compound of the following formula or a salt, hydrate or prodrug thereof tolerable for a rodent:

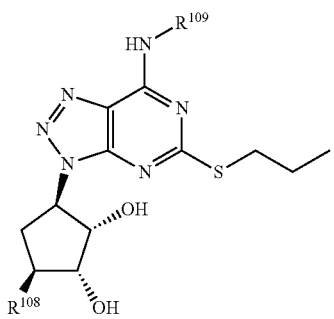

In this formula $R^{108}$ is heterocyclyl, heterocyclyl-$C_{1-8}$-alkyl, heteroaryl or heteroaryl-C1-8-alkyl or halo-$C_{1-8}$-alkyl. $R^{109}$ is $C_1$ to $C_8$ alkyl, $C_{1-8}$-alkoxy-$C_{1-8}$-alkylthio-$C_{1-8}$-alkyl, $C_3$ to $C_8$ cycloalkyl, $C_{3-8}$-cycloalkyl-$C_{1-8}$-alkyl, phenyl-$C_{1-8}$-alkyl, heterocyclyl-$C_{1-8}$-alkyl, heteroaryl-$C_{1-8}$-alkyl or halo-$C_{1-8}$-alkyl.

Another example of an antagonist of the ADP receptor P2Y12 is a compound according to the international patent application WO 2000/34283. Such a compound may be a compound of the following formula or a salt, hydrate or prodrug thereof tolerable for a rodent:

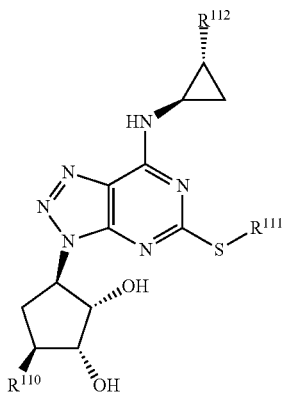

In this formula $R^{110}$ is OH, $CH_2OH$ or $OCH_2CH_2OH$. $R^{111}$ is $C_3$ to $C_5$ alkyl which may be substituted for example with one or more halogen atoms. $R^{112}$ is phenyl which may be substituted with one or more fluorine atoms.

An example of a triazolo (4,5-D)-pyrimidine compound according to WO 2000/34283 is ticagrelor (Brilinta®, Brilique®, Possia®). This antagonist is a reversible antagonist of the ADP receptor P2Y12. Serious and minor bleedings are also known for ticagrelor as adverse effects when used in humans.

An example of an antagonist of the ADP receptor P2Y12 is a compound according to the international patent application WO 2008/128647. Such a compound may be a compound of the following formula or a salt, hydrate or prodrug thereof tolerable for a rodent:

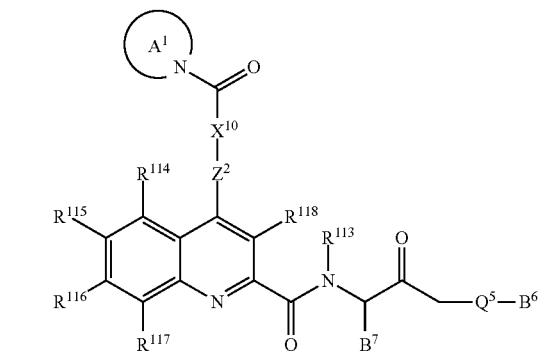

In this formula $R^{113}$ may, inter alia, be H or $C_1$ to $C_4$ alkyl. $R^{114}$ to $R^{118}$ are each independently, inter alia, H, $C_1$ to $C_6$ alkyl, $C_1$ to $C_3$ fluoroalkyl, a halogen, CN or optionally substituted phenyl (see also WO 2008/128647). $Z^2$ may be a alkylenyl, alkenyl or alkynyl group. $X^{10}$ may be a $C_3$ to $C_8$ alkylenyl, $C_{1-3}$-cycloalkylenyl or $C_3$ to $C_{15}$ heterocyclyl group. Ring $A^1$ is a 3- to 10-membered heterocyclic residue which may include 0, 1, 2 or 3 additional heteroatoms of N, S or O and may be mono-, bicyclic or spiroheterocyclic. $Q^5$ may be, inter alia, a mono- or bicyclic 3- to 15-membered heterocycle. $B^6$ and $B^7$ may, inter alia, each independently be H, $C_1$ to $C_4$ alkyl, $C_3$ to $C_8$ cycloalkyl, $C_6$ to $C_4$ aryl, a 3- to 7-membered heterocycle, —C(O)OH, —$CNH_2$, —C(O)NH—($C_{1-6}$ alkyl), —C(O)O—($C_{1-6}$ alkyl), or —C(O)N(R)—R (see also WO 2008/128647).

Another example of an antagonist of the ADP receptor P2Y12 is a compound according to the international patent application WO 2008/155022. Such a compound may be a compound of the following formula or a salt, hydrate or prodrug thereof tolerable for a rodent:

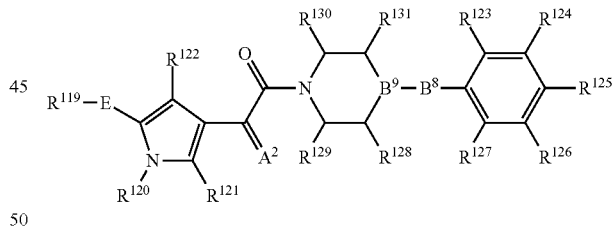

In this formula $A^2$ may be oxygen or N—OH. $B^9$ may be N or CH. $B^8$ may be a covalent bond, —C(O)— or methylenyl. E may be a covalent bond, —O—C(O)— or —NH—C(O)—. $R^{119}$ is H, $C_1$ to $C_8$ alkyl, $C_{0-4}$ alkylene-($C_{3-8}$ cycloalkyl), $C_{0-4}$-alkylene-($C_{6-14}$ aryl) or $C_0$ to $C_4$-alkylene-heterocyclyl. $R^{120}$ is H, —NH—C(O)— or —O—C(O)—. $R^{121}$ is $C_1$ to $C_8$ alkyl, $CF_3$ or ($C_{1-8}$ alkylene)-C(O)—O—$R^{132}$. $R^{122}$ is H, a halogen, $C_1$ to $C_8$ alkyl, ($C_{1-8}$ alkylene) C(O)—O—$R^{132}$, ($C_{2-6}$ alkenylene)-(O)—C(O)—O—$R^{132}$ or ($C_3$ to $C_8$ cycloalkyl)-C(O)—O—$R^{132}$. In this case $R^{132}$ may be H, $C_1$- to $C_8$ alkyl or $C_{0-4}$-alkylene-($C_{3-8}$ cycloalkyl). $R^{123}$ to $R^{127}$ may each independently, inter alia, be H, a halogen, CN, $NO_2$, $C_1$ to $C_8$ alkyl, $C_0$- to $C_4$-alkylene-O—$R^{132}$, ($C_{0-4}$ alkylene)-C(O)—O—$R^{132}$, ($C_{0-4}$ alkylene)-C(O)—$R^{132}$, ($C_{0-4}$ alkylene)-C(O)—N—$R^{132}R^{133}$ or ($C_{0-4}$ alkylene)-CN—$R^{132}R^{133}$ (see WO 2008/155022). Here, $R^{133}$, inter alia, may be H or $C_1$ to $C_8$ alkyl. $R^{128}$ to $R^{131}$ may each independently, inter alia, be H, =O, —OH or $C_1$ to $C_8$ alkyl.

An example of an antagonist of the ADP receptor P2Y12 is a compound according to the international patent application WO 2010/122504. Such a compound may be a compound of the following formula or a salt, hydrate or prodrug thereof tolerable for a rodent:

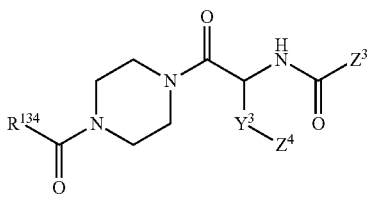

In this formula $Z^3$ is a substituted-2-thiazole ring or -4-thiazole ring. Here, a -2-thiazole ring may be substituted at position 4 with an aryl group. At position 5 a 2-thiazole ring may be substituted with a halogen, $C_1$ to $C_4$ alkyl, $C_2$ to $C_4$ alkenyl, phenyl, or di-$C_{1-6}$-alkylamino. A corresponding -4-thiazole ring may be substituted at position 2 with an aryl group and at position 5 with H, a halogen, COOH, $C_1$ to $C_4$ alkyl, COO($C_{1-4}$ alkyl), $C_2$ to $C_4$ alkenyl, phenyl, $C_1$ to $C_4$ alkylamino, di-$C_{1-4}$-alkylamino, heterocyclyl or 2-methoxymethyl-cycloprop-1-yl.

In the above formula $Y^3$—$Z^4$ may represent a bond and hydrogen. $Y^3$ may also be $C_1$ to $C_3$ alkanediyl. In this case, $Z^4$ in the above formula is H, OH, phenyl, —COOH, —COO($C_{1-4}$-alkyl), —P(O)(OH)$_2$, —P(O)(O—[$C_{1-4}$-alkyl])$_2$, —P(O)(O—[$C_{1-4}$ alkoxy]-C(O)O—CH$_2$)$_2$ or —P(O)(NH[$C_{1-4}$ alkoxy]-C(O)—[$C_{1-4}$ alkyl])$_2$ (see WO 2010/122504). $R^{134}$ is $C_1$ to $C_6$ alkoxy.

Another example of a typically orally administered thrombocyte aggregation inhibitor is an antagonist of the GPIIb/IIIa receptor on platelets. Such a compound is also suitable as a rodenticide according to the present disclosure.

This may for example be a derivative of the snake venom of the saw-scaled viper such as tirofiban (Aggrastat®). This compound is described in the international patent application WO 99/38827. It, however, has to be administered parenterally.

In some embodiments a suitable antagonist of the GPIIb/IIIa receptor is a compound according to the international patent application WO 90/15620. It may be, for example eristicophin, cotiarin, crotatroxin, cerastin, durissin, horridin, ruberin, lachesin, basilicin, lutosin, molossin, oreganin, viridin, tergeminin or barbourin. It may also be a peptide derivative of the following formula:

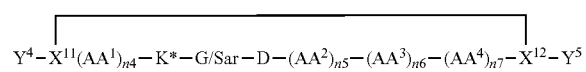

In this formula $Y^4$ and $Y^5$ are each independently a non-interfering substituent or absent (see WO 90/15620). K is a substituted or unsubstituted lysyl residue of the formula $R^{135}R^{136}{}_2N(CH_2)_4CHNHCO$. Here, $R^{135}$ and $R^{136}$ may each independently be H or $C_1$ to $C_6$ alkyl (see WO 90/15620). $X^{11}$ and $X^{12}$ are each independently any residue which enables the ring formation between $X^{11}$ and $X^{12}$ symbolized in the preceding formula. (AA$^1$) is a small neutral amino acid and $n_1$ is one of the numbers 0, 1, 2 or 3. (AA$^2$) is a large non-polar amino acid and $n_2$ is one of the numbers 0, 1, 2 or 3. (AA$^3$) is a proline residue or a modified proline residue, and $n_3$ is a number from 0 to 1. (AA$^4$) is a small neutral amino acid or an N-alkylated form thereof, and $n_4$ is one of the numbers 0, 1, 2 or 3.

An example of a corresponding GPIIb/IIIa receptor antagonist is an arginine glycine aspartate mimetic such as the peptide eptifibatide (Integrilin®). This active agent, however, in the commercially available form has to be administered parenterally.

In some embodiments a suitable antagonist of the GPIIb/IIIa receptor is a compound according to U.S. Pat. No. 5,721,366. Such a compound may be a compound of the following formula or a salt, hydrate or prodrug thereof tolerable for a rodent:

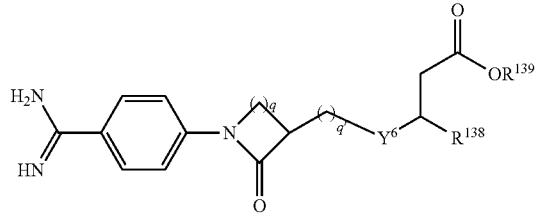

In this formula $Y^6$ may be

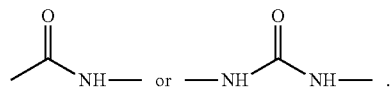

The variable q is one of the integers 2 and 3. The variable q' represents an integer of 0, 1, 2, 3 or 4. In some embodiments q'=0. $R^{138}$ is H, $C_1$ to $C_6$ alkyl, $C_1$ to $C_8$ alkoxy, $C_1$- to $C_8$-alkoxy-carbonyl, $C_2$ to $C_6$ alkenyl, $C_2$ to $C_6$ alkynyl, cycloalkyl, and aryl. $R^{139}$ is $C_1$ to $C_6$ alkyl, $C_2$ to $C_6$ alkenyl, $C_2$ to $C_6$ alkynyl, alkoxycarbonyloxyalkyl, $C_3$ to $C_6$ cycloalkyl or aryl. In some embodiments $R^{139}$ is $C_2$ alkyl, $C_3$ alkyl or $C_4$ alkyl. An example of a GPIIb/IIIa receptor antagonist according to U.S. Pat. No. 5,721,366 is orbofiban, ethyl N-{[(3S)-1-(4-carbamimidoylphenyl)-2-oxo-3-pyrrolidinyl]carbamoyl}-β-alaninate.

Related suitable antagonists of the GPIIb/IIIa receptor are disclosed in the international patent application WO 95/14683. Such a compound may, for example, be a compound of the following formula, or a salt, hydrate or prodrug thereof tolerable for a rodent:

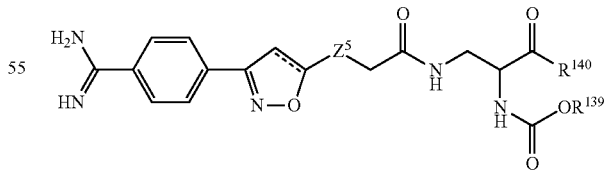

In this formula, $Z^5$ may be a single covalent bond, $C_1$ to $C_7$ alkyl, $C_2$ to $C_7$ alkenyl, or $C_2$ to $C_7$ alkynyl. $R^{139}$ is as described above. $R^{140}$ may be hydroxy, $C_1$ to $C_{10}$ alkoxy, $C_3$- to $C_{10}$-alkylcarbonyloxyalkyloxy- or $C_7$ to $C_{11}$ aralkyloxy. In some embodiments $R^{140}$ is methyl or ethyl. An example of a GPIIb/IIIa receptor antagonist according to WO 95/14683 is roxifiban (DMP 754, MK 0853, XJ 754, Lumaxis®), methyl $N^3$-[2-{3-(4-formamidino-phenyl)-isoxazolin-5-(R)-yl}acetyl]-$N^2$-(n-butyloxycarbonyl)-2,3-(S)diaminopropionate. ---- indicates that the corresponding bond in some embodiments may is a single bond and in some embodiments a double bond.

In some embodiments a suitable antagonist of the GPIIb/IIIa receptor is a compound according to the European patent EP 0656348. Such a compound may, for example, be a compound of the following formula or a salt, hydrate or prodrug thereof tolerable for a rodent:

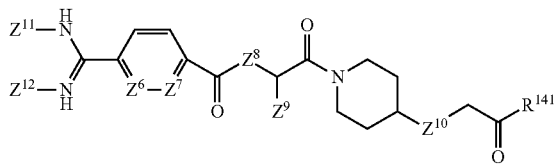

In this formula one of $Z^6$ and $Z^7$ is CH and the other CH, $C_1$ to $C_8$ alkyl, $C_1$ to $C_8$ alkoxy, or N. $Z^8$ is NH, $C_1$- to $C_8$-alkyl-N or $C_{1-8}$-alkoxy-($C_{1-8}$-alkyl)-N. $Z^9$ is H or $C_1$ to $C_8$ alkyl optionally substituted with OH, SH, $CONH_2$, CONH—$C_{1-8}$-alkyl, $C_{1-8}$-alkylthio, aryl, $NH_2$, NH—($C_{1-8}$-alkyl)-, N($C_{1-8}$ alkyl)($C_{1-8}$ alkyl) or O—($C_{1-8}$ alkyl).

$Z^{10}$ may be O, $CH_2$, NH, acyl-N or $C_1$- to $C_8$-alkyl-OC(O)N. $Z^{11}$ and $Z^{12}$ may be H, $C_1$ to $C_8$ alkyl, OH, $C_1$ to $C_8$ alkoxy, $C_{1-8}$-alkoxy-$C_{1-8}$alkyl, carboxy-$C_{1-8}$-alkyl, P(O)[O—($C_1$ to $C_8$ alkyl)]$_2$, C(O)O—$C_{1-8}$-alkyl, OC(O)—$C_{1-8}$-alkyl, OC(O)O—$C_{1-8}$-alkyl or C(O)S—$C_{1-8}$-alkyl, wherein at least one of $Z^{11}$ and $Z^{12}$ is H (hydrogen) or $Z^1$ and $Z^{12}$ together with the N atoms to which they are bonded are a (5,5-dimethyl or 5-oxo)-4,5-dihydro-1,2,4-oxadiazol-3-yl group. $R^{141}$ may be $NH_2$, NH($C_{1-8}$ alkyl), NH($C_{1-8}$ alkyl)COOH, NH—($C_{1-8}$ alkyl)-COO—$C_{1-8}$-alkyl, $C_1$ to $C_8$ alkyloxy or $C_1$ to $C_8$ alkenyloxy. In some embodiments, $R^{141}$ is $C_1$ alkyloxy or $C_2$ alkyloxy. An example of a GPIIb/IIIa receptor antagonist according to EP 0656348 is sibrafiban (Ro 48-3657, Xubix®). The most common adverse drug effects of sibrafiban on humans include bleedings.

In some embodiments, a suitable antagonist of the GPIIb/IIIa receptor is a compound according to the international patent application WO 93/19046. Such a compound may, for example, be a compound of the following formula or a salt thereof tolerable for a rodent:

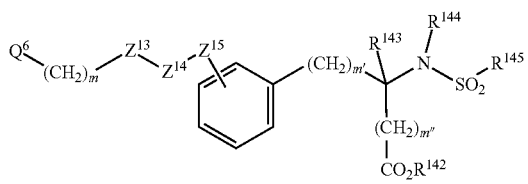

In this formula $Q^6$ is a four- to eight-membered heterocyclic ring having 1, 2, 3 or 4 heteroatoms which are N, O or S. The variable m represents an integer of 0, 1, 2 or 4 to 8. The variables m' and m" are each independently an integer from 0 to 2. $Z^{13}$ and $Z^{14}$ may each independently be phenyl, O, $SO_2$,

or a 5- or 6-membered ring which may include 0 or 1 of the heteroatoms N and O. $Z^{14}$ an optionally present group which may be O, —NHCO—, —CONH— or $C_{1-5}$-alkyl-OC(O)N. $R^{142}$ may be H or $C_1$ to $C_8$ alkyl. $R^{143}$ and $R^{144}$ are each independently H, $C_1$ to $C_4$ alkyl or $C_4$ to $C_{10}$ aralkyl. $R^{145}$ may be aryl, $C_1$ to $C_{10}$ alkyl or $C_1$ to $C_{10}$ cycloalkyl or $C_4$ to $C_{10}$ aralkyl. A suitable further antagonist of the GPIIb/IIIa receptor according to the international patent application WO 93/19046, for example, is a compound of the following formula or a salt thereof tolerable for a rodent:

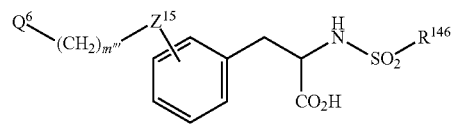

In this formula, $Q^6$ is a six-membered saturated heterocyclic ring having 1 or 2 heteroatoms which are N. The variable m''' is an integer of 2, 3, 4, 5 or 6. $Z^{15}$ may be O,

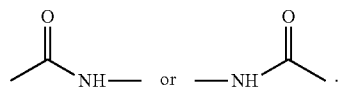

$R^{146}$ may be aryl, $C_1$ to $C_{10}$ alkyl or $C_4$ to $C_{10}$ aralkyl. In some embodiments $R^{146}$ is $C_3$ or $C_4$ alkyl. An example of a GPIIb/IIIa receptor antagonist according to WO 93/19046 is tirofiban ((S)-2-(butylsulfonamino)-3-(4-[4-(piperidin-4-yl)-butoxy]phenyl)-propanoic acid, Aggrastat®). As a frequent occurring adverse effect on people light bleedings are known, there may also be severe bleedings.

The unique efficacy of coumarin and indandione compounds previously used as a rodenticide is based on their oral intake with a delayed onset of the intoxication effect. In other words, no acute toxicity is observed. Thus, no temporal relationship between intake of the compound and the onset of the effect is observable for the rodent. Moreover, the uses and methods disclosed herein are generally based on the fact that the respective active agent is offered in a dose at which no acute toxicity occurs. The uses and methods disclosed herein are basically suitable for the control of wild rodents in as far as the active agent can be orally supplied to a rodent. Without being bound to any particular theory, the uses and methods disclosed herein for controlling wild rodents are particularly useful in that a compound used has a long half-life, such as several days and a progressive accumulation in the respective range of the LD (lethal dose) 100 can take place. Moreover, the respective LD 100 can normally be achieved with normal amounts of feed of the rodent such as a rat. Furthermore, no ceiling effect is known, i.e. the intestinal resorption mechanisms are to be regarded as not exhaustible in the relevant frame. Finally, an active agent specified for the use disclosed herein may be mixed with a bait, which may be very tasty, or an application onto a bait is possible without compromising the taste. Whether it comes or may come to chronic toxicities usually is irrelevant for the effect as a rodenticide described herein.

It should be further noted without being bound to any particular theory, that a single accidental ingestion, for example, of a bait, does not lead to death in humans. In addition to the large difference in body weight and thus the absolute lethal dose between e.g. rat and human, moreover, a bait is not suited for an intentional provision with lethal consequence, because a lethal effect on humans with the dimensions of a rodent bait typically cannot be practically realized. The corresponding active agent had to be taken repeatedly in a large amount on a carrier which is not suited for humans in order to achieve a lethal dose.

Further, a composition is disclosed which comprises one or more active agents described herein. A corresponding composition may include one or more agents described herein and a carrier. A corresponding composition may consist substantially of one or more active agents described herein and a carrier. In some embodiments a composition disclosed herein may be combined with a composition comprising a cereal flour, a cereal bran, a gelling agent, a sugar, an oil, an emulsifier and a humectant, such as described in the international patent application WO 2014/186885. In some embodiments an active agent disclosed herein may be combined with a composition which, as described for example in WO 2014/186885, comprises a cereal flour, a cereal bran, a gelling agent, a sugar, an oil, an emulsifier and a humectant.

In some embodiments a bait provided with an active agent disclosed herein may be provided. A corresponding bait may, for example, be provided with a composition as described in the foregoing. In some embodiments an active agent disclosed herein may be provided in packaged form. Such a package, for example, may comprise a housing, a cover and a cavity there between as described in international patent application WO 2003/061376. In some embodiments a wild rodent bait disclosed herein is used in connection with a bait station, for example, such as is commercially available. A corresponding bait may include any suitable substances which are appropriate as rodent food, as long as corresponding substances do not lead themselves to death of the corresponding rodent within a few days. An illustrative example is a grain-based bait.

A wild rodent bait disclosed herein may include, for example, seeds and/or cereals. The wild rodent bait may be provided, for example, in the form of granules (pellets), in the form of packaged cereals or packaged granules or as a bait block. In some embodiments an active agent disclosed herein may be contained in a bait block which includes a polymeric binder in the form of a polymer based on an acrylic acid ester and acrylonitrile, as described, for example, in international patent application WO 2014/064272.

An active agent mentioned in the foregoing can also be used in combination with another active agent mentioned in the foregoing. For example, a thienopyridine compound according to U.S. Pat. Nos. 4,051,141 and 4,591,592 or a thienopyridine compound according to European patent EP 0099802 or U.S. Pat. No. 4,529,596 may be used in combination with a thrombin inhibitor. A thienopyridine compound according to U.S. Pat. Nos. 4,051,141 and 4,591,592 or a thienopyridine compound according to EP 0 099802 or U.S. Pat. No. 4,529,596 may be used as another example in combination with a thrombin receptor antagonist. Moreover, a thienopyridine compound according to U.S. Pat. Nos. 4,051,141 and 4,591,592 or a thienopyridine compound according to EP 0 099802 or U.S. Pat. No. 4,529,596 may be used in combination with a factor Xa inhibitor. A thieno-pyridine compound according to U.S. Pat. Nos. 4,051,141 and 4,591,592 or a thienopyridine compound according to EP 0 099802 or U.S. Pat. No. 4,529,596 may also be used in combination with a GPIIb/IIIa receptor antagonist.

As another example a compound according to the European patent EP 0 099802 or U.S. Pat. No. 5,288,726 may be used in combination with a thrombin inhibitor. A compound according to EP 0 099802 or U.S. Pat. No. 5,288,726 can be used as another example in combination with a thrombin receptor antagonist. A compound according to EP 0 099802 or U.S. Pat. No. 5,288,726 can also be used in combination with a factor Xa inhibitor. Moreover, a compound according to EP 0 099802 or U.S. Pat. No. 5,288,726 may be used in combination with a GPIIb/IIIa receptor antagonists.

The blood coagulation systems of rats and humans are very similar. Even in humans, for example, coumarin overdoses may lead to life-threatening bleedings. A very careful anticoagulant control is therefore a prerequisite for its safe therapeutic use. It has further been found that an originally looked-for dissociation of haemostasis blocking effects of the conventional novel direct anticoagulants (e.g. dabigatran) does not occur as expected and bleeding complications in humans unfortunately arise. With these novel oral anticoagulants there is a continuous dose-dependent increasing rate of serious and fatal bleeding. Without being bound to theory, therefore, it is shown that the uses, methods and baits disclosed herein are effective in combatting harmful rodents. Moreover, no alternative activation paths in rodent organisms are known for the compounds disclosed herein such that no development of resistances has to be expected.

The content of scientific articles, patents and patent applications as well as the content of all other documents and electronically available information mentioned or cited herein is hereby incorporated by reference in their entirety to the same extent as if each individual publication would be specifically and individually incorporated by reference. In case of an objection the present document is decisive. The applicant reserves the right to incorporate physically any including all material and information from any such articles, patents and patent applications or other physical and/or electronic documents into this document.

The mention or discussion of a previously published document in this specification should not necessarily be understood as an admission that such a document is associated to the prior art or represents general knowledge of a person skilled in the art.

The methods, applications, compositions, combinations and the harmful rodent baits described herein illustratively may be implemented and used in an appropriate manner without a single element or elements, limitation or limitations which are not explicitly disclosed herein. The terms and expressions used herein are, moreover, used as descriptive terms and not to be understood as a limitation, and it is not intended when using such terms and expressions to exclude any equivalents of the features shown and described or portions thereof. It will be appreciated that within the scope of the claimed invention various modifications are possible. Thus, it should be understood that a person skilled in the art may revert to modifications and variations of the disclosed embodiments, although the methods, applications, compositions and combinations disclosed herein are described and illustrated to a person skilled in the art in sufficient detail in order to apply them, and that such modifications and variations are to be regarded to fall within the scope of the invention.

Thus, it should be understood that the methods, applications, compositions and combinations described herein in sufficient detail and illustrated with reference to certain specific embodiments, so that they can be implemented by a person skilled in the art, should not be limited thereto, rather modifications and variations of the embodiments described are regarded as included within the scope of the invention.

Herein, the invention has been described extensively and generally. Each of the narrower species and subgenus groupings that fall under the general disclosure also form part of the methods, applications, compositions and combinations. This includes the general description of the methods, applications, compositions and combinations with a condition or a negative limitation, which exclude a subject matter from the genus, regardless of whether the excluded subject matter is explicitly reproduced herein.

Further embodiments are set forth in the following claims. Further, if features or aspects of the invention are specified in the form of Markush groups a person skilled in the art will recognize that the invention is described in this regard with respect to each individual member or each individual sub-group of members of Markush groups.

As will be readily appreciated by a person skill in the art with reference to the present disclosure, other material compositions, means, uses or steps that exist at the present time or will be developed in future and which substantially lead to the same result as the exemplary embodiments described herein may be used according to the present invention, too.

The invention claimed is:

1. A method of combatting a rodent, the method comprising administering to the rodent a rodenticide comprising at least a factor Xa inhibitor and an antagonist of the ADP receptor P2Y12, wherein the inhibitor of factor Xa is a compound of the following formula or a salt or hydrate thereof tolerable for a rodent:

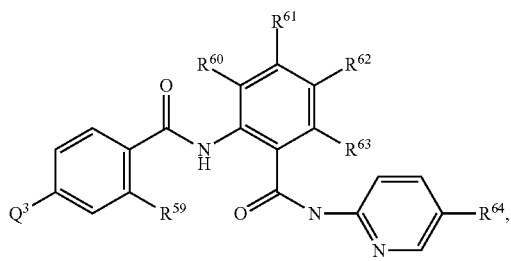

wherein $Q^3$ is:

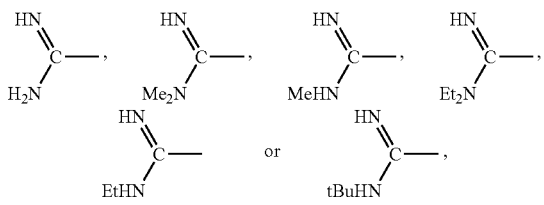

$R^{59}$ is H, F, Cl or Br, $R^{60}$, $R^{61}$, $R^{62}$ and $R^{63}$ are each independently H, F, Cl, Br, Me, $NO_2$, OH, OMe, $NH_2$, NHAc, $NHSO_2Me$, $CH_2OH$ and $CH_2NH_2$ and $R^{64}$ is F, Cl, Br, Me, OH or OMe; and wherein the antagonist of the ADP receptor P2Y12 is:

i) a compound of the following formula or a salt or a hydrate thereof tolerable for a rodent:

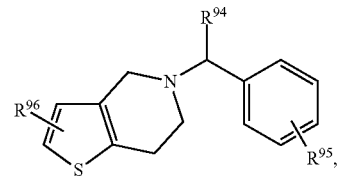

wherein $R^{94}$ is H, a halogen, hydroxy or $C_{1-6}$ alkyl, $R^{95}$ is H, a halogen, hydroxy, nitro, $C_{1-6}$ alkyl or $C_{1-6}$ alkoxy and $R^{96}$ is H or a halogen;

ii) a compound of the following formula or a salt or a hydrate thereof tolerable for a rodent:

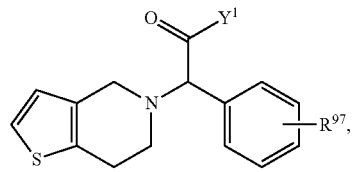

wherein $Y^1$ is $-OR^{98}$ or $-N(R^{99})R^{100}$, wherein $R^{99}$ and $R^{100}$ are each independently H, a halogen or a $C_{1-4}$ alkyl group and $R^{98}$ is H or $C_{1-4}$ alkyl and $R^{97}$ is H, a halogen or $C_{1-4}$ alkyl group; or iii) a compound of the following formula or a salt or a hydrate thereof tolerable for a rodent:

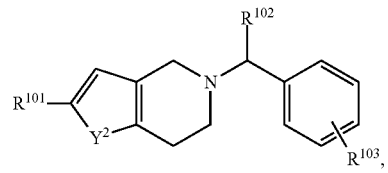

wherein $R^{101}$ is H, OH, amino, $C_1$ to $C_4$ alkoxy, Aryl-$C_{1-4}$-alkyloxy, $C_{1-18}$ alkanoyloxy, $C_{3-6}$ alkenoyloxy or arylcarbonyloxy, $R^{102}$ is $C_{1-10}$ alkanoyl, $C_{3-6}$ alkenoyl, $C_{4-8}$ cycloalkylcarbonyl including 3 to 7 ring atoms, substituted benzoyl or 5,6-dihydro-1,4,2-dioxazine-3-yl, $Y^2$ is NH, O or S, $R^{103}$ is H, a halogen, OH, amino, $C_{1-4}$ alkyl, $C_{1-4}$ alkoxy, $C_{1-4}$ alkylthio or a carboxy group.

2. The method according to claim 1, wherein the inhibitor of factor Xa comprises betrixaban and the antagonist of the ADP receptor P2Y12 comprises prasugrel.

3. The method according to claim 2, wherein the rodenticide is administered as a series of doses.

4. The method according to claim 3, wherein each dose does not result in acute toxicity to the rodent.

5. The method according to claim 3, wherein each dose is nonlethal to humans.

6. The method according to claim 2, wherein each dose of the rodenticide is provided in a food bait.

7. A harmful rodent bait comprising at least a rodenticidally effective amount of a factor Xa inhibitor and a rodenticidally effective amount of an antagonist of the ADP receptor P2Y12, wherein the inhibitor of factor Xa is a compound of the following formula or a salt or hydrate thereof tolerable for a rodent:

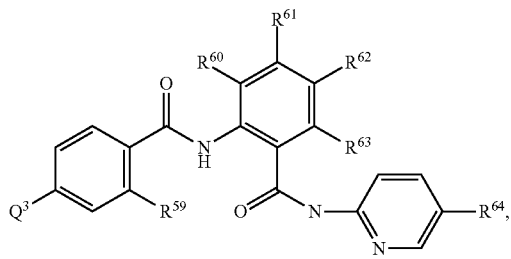

wherein $Q^3$ is:

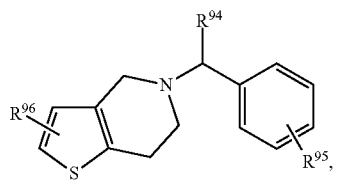

$R^{59}$ is H, F, Cl or Br, $R^{60}$, $R^{61}$, $R^{62}$ and $R^{63}$ are each independently H, F, Cl, Br, Me, $NO_2$, OH, OMe, $NH_2$, NHAc, $NHSO_2Me$, $CH_2OH$ and $CH_2NH_2$ and $R^{64}$ is F, Cl, Br, Me, OH or OMe; and wherein the antagonist of the ADP receptor P2Y12 is:

i) a compound of the following formula or a salt or a hydrate thereof tolerable for a rodent:

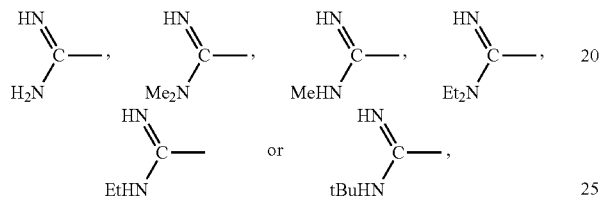

wherein $R^{94}$ is H, a halogen, hydroxy or $C_{1-6}$ alkyl, $R^{95}$ is H, a halogen, hydroxy, nitro, $C_{1-6}$ alkyl or $C_{1-6}$ alkoxy and $R^{96}$ is H or a halogen;

ii) a compound of the following formula or a salt or a hydrate thereof tolerable for a rodent:

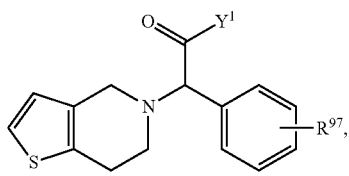

wherein $Y^1$ is $—OR^{98}$ or $—N(R^{99})R^{100}$, wherein $R^{99}$ and $R^{100}$ are each independently H, a halogen or a $C_{1-4}$ alkyl group and $R^{98}$ is H or $C_{1-4}$ alkyl and $R^{97}$ is H, a halogen or $C_{1-4}$ alkyl group; or iii) a compound of the following formula or a salt or a hydrate thereof tolerable for a rodent:

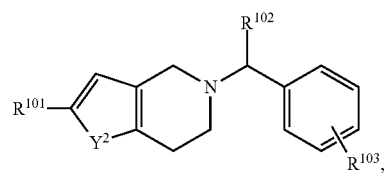

wherein $R^{101}$ is H, OH, amino, $C_1$ to $C_4$ alkoxy, Aryl-$C_{1-4}$-alkyloxy, $C_{1-18}$ alkanoyloxy, $C_{3-6}$ alkenoyloxy or arylcarbonyloxy, $R^{102}$ is $C_{1-10}$ alkanoyl, $C_{3-6}$ alkenoyl, $C_{4-8}$ cycloalkylcarbonyl including 3 to 7 ring atoms, substituted benzoyl or 5,6-dihydro-1,4,2-dioxazine-3-yl, $Y^2$ is NH, O or S, $R^{103}$ is H, a halogen, OH, amino, $C_{1-4}$ alkyl, $C_{1-4}$ alkoxy, $C_{1-4}$ alkylthio or a carboxy group.

8. The harmful rodent bait according to claim 7, wherein the inhibitor of factor Xa comprises betrixaban and the antagonist of the ADP receptor P2Y12 comprises prasugrel.

9. The harmful rodent bait according to claim 8, further comprising a rodent food, the rodent food comprising the betrixaban and the prasugrel.

10. The harmful rodent bait according to claim 8, wherein the rodent bait comprises a combined concentration of the betrixaban and the prasugrel that is nonlethal to humans when ingested.

* * * * *